United States Patent
Desai et al.

(10) Patent No.: US 10,147,210 B1
(45) Date of Patent: Dec. 4, 2018

(54) DATA VISUALIZATION SYSTEM

(71) Applicant: AMAZON TECHNOLOGIES, INC., Seattle, WA (US)

(72) Inventors: Nishitkumar Ashokkumar Desai, Bellevue, WA (US); Frank Florian Liberato, Jr., Kirkland, WA (US); I-Hung Wang, Seattle, WA (US); Daniel Bibireata, Bellevue, WA (US); Muralidhar Koka, Kirkland, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 14/657,937

(22) Filed: Mar. 13, 2015

(51) Int. Cl.
| | |
|---|---|
| *G09G 5/00* | (2006.01) |
| *G06T 11/60* | (2006.01) |
| *G06N 99/00* | (2010.01) |
| *H04N 7/18* | (2006.01) |
| *G06K 9/00* | (2006.01) |

(52) U.S. Cl.
CPC .......... *G06T 11/60* (2013.01); *G06K 9/00228* (2013.01); *G06N 99/005* (2013.01); *H04N 7/183* (2013.01); *G06T 2207/10004* (2013.01); *G06T 2207/20221* (2013.01); *G06T 2215/16* (2013.01)

(58) Field of Classification Search
None
See application file for complete search history.

(56) References Cited

U.S. PATENT DOCUMENTS

| | | | |
|---|---|---|---|
| 7,225,980 B2 | 6/2007 | Ku et al. | |
| 7,949,568 B2 | 5/2011 | Fano et al. | |
| 7,979,204 B2* | 7/2011 | Kobuya | G01C 21/36 |
| | | | 345/629 |
| 8,009,864 B2 | 8/2011 | Linaker et al. | |
| 8,085,990 B2* | 12/2011 | Ofek | G06T 3/4038 |
| | | | 345/629 |
| 8,189,855 B2 | 5/2012 | Opalach et al. | |
| (Continued) | | | |

OTHER PUBLICATIONS

Asthana, et al., "An indoor wireless system for personalized shopping assistance", CiteSeerX, In Proceedings of IEEE Workshop on Mobile Computing Systems and Applications, 1994; [retrieved on Jun. 30, 2013]. Retrieved from the Internet: <URL:http://citeseerx.ist.psu.edu/viewdoc/summary?doi=10.1.1.127.3033>.

(Continued)

*Primary Examiner* — David H Chu
(74) *Attorney, Agent, or Firm* — Lindauer Law, PLLC

(57) ABSTRACT

Described are systems and techniques to generate data for display to present visualizations of data acquired from sensors in a facility. The data visualizations may be used to develop, configure, administer, or otherwise support operation of the facility. In one implementation, the visualization may include a view incorporating aggregated images acquired from multiple cameras, depth data, tracking information about objects in the facility, and so forth. An analyst may use the data visualization to determine occurrence of an action in the facility such as a pick of an item, place of an item, what item was involved with an action, what user was involved with the action, and so forth. Based on the information presented by the data visualization, changes may be made to data processing parameters.

21 Claims, 12 Drawing Sheets

(56) References Cited

U.S. PATENT DOCUMENTS

| | | | |
|---|---|---|---|
| 8,605,115 B2* | 12/2013 | Dettinger | G06Q 90/00 |
| | | | 345/173 |
| 8,630,924 B2* | 1/2014 | Groenevelt | G06Q 10/087 |
| | | | 211/90.01 |
| 8,834,176 B2* | 9/2014 | Jung | G05B 19/4183 |
| | | | 345/633 |
| 9,235,928 B2 | 1/2016 | Medioni et al. | |
| 2003/0085992 A1* | 5/2003 | Arpa | G06T 7/0024 |
| | | | 348/47 |
| 2003/0227470 A1* | 12/2003 | Genc | G06F 3/011 |
| | | | 345/633 |
| 2008/0036778 A1* | 2/2008 | Sheha | G01C 21/3664 |
| | | | 345/502 |
| 2008/0215462 A1 | 9/2008 | Sorensen et al. | |
| 2011/0011936 A1* | 1/2011 | Morandi | G06K 9/00 |
| | | | 235/454 |
| 2011/0246064 A1* | 10/2011 | Nicholson | G01C 21/00 |
| | | | 701/467 |
| 2012/0106784 A1* | 5/2012 | Cho | G06T 7/2033 |
| | | | 382/103 |
| 2012/0284132 A1 | 11/2012 | Kim et al. | |
| 2013/0284806 A1 | 10/2013 | Margalit | |
| 2014/0223279 A1* | 8/2014 | Algreatly | G06T 11/00 |
| | | | 715/233 |
| 2014/0228118 A1* | 8/2014 | Hardy | G06T 19/006 |
| | | | 463/31 |
| 2015/0073907 A1* | 3/2015 | Purves | G06Q 20/32 |
| | | | 705/14.58 |
| 2015/0074506 A1* | 3/2015 | Dunn | G06F 21/6218 |
| | | | 715/230 |
| 2015/0086107 A1* | 3/2015 | Dedeoglu | G06K 9/00771 |
| | | | 382/154 |
| 2015/0119031 A1* | 4/2015 | Brownworth | H04W 60/005 |
| | | | 455/435.1 |
| 2015/0120616 A1* | 4/2015 | Sullivan | G06F 3/0481 |
| | | | 706/11 |
| 2015/0146004 A1* | 5/2015 | Kritt | G06K 9/00671 |
| | | | 348/159 |
| 2015/0193982 A1* | 7/2015 | Mihelich | H04W 4/026 |
| | | | 345/633 |

OTHER PUBLICATIONS

Kalnikaite, et al., "How to Nudge in Situ: Designing Lambent Devices to Deliver Information Salience in Supermarkets", ACM, In proceeding of: UbiComp 2011: Ubiquitous Computing, 13th International Conference, UbiComp 2011, Beijing, China, Sep. 17-21, 2011. Retrieved from Internet: <URL:http://www.researchgate.net/publication/221568350_How_to_nudge_in_Situ_designing_lambent_devices_to_deliver_salient_information_in_supermarkets>.

Pop, Cristian, "Introduction to the BodyCom Technology", AN1391, DS01391A, Microchip Technology, Inc., May 2, 2011.

* cited by examiner

DATA VISUALIZATION SYSTEM

BACKGROUND

Retailers, wholesalers, and other product distributors typically maintain an inventory of various items that may be ordered, purchased, leased, borrowed, rented, viewed, and so forth, by clients or customers. For example, an e-commerce website may maintain inventory in a fulfillment center. When a customer orders an item, the item is picked from inventory, routed to a packing station, packed, and shipped to the customer. Likewise, physical stores maintain inventory in customer accessible areas (e.g., shopping area), and customers can pick items from inventory and take them to a cashier for purchase, rental, and so forth. Many of those physical stores also maintain inventory in a storage area, fulfillment center, or other facility that can be used to replenish inventory located in the shopping areas or to satisfy orders for items that are placed through other channels (e.g., e-commerce). Other examples of entities that maintain facilities holding inventory include libraries, museums, rental centers, and so forth. In each instance, for an item to be moved from one location to another, it is picked from its current location and transitioned to a new location. It is often desirable to monitor the location or movement of inventory, users, and other objects within the facility.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
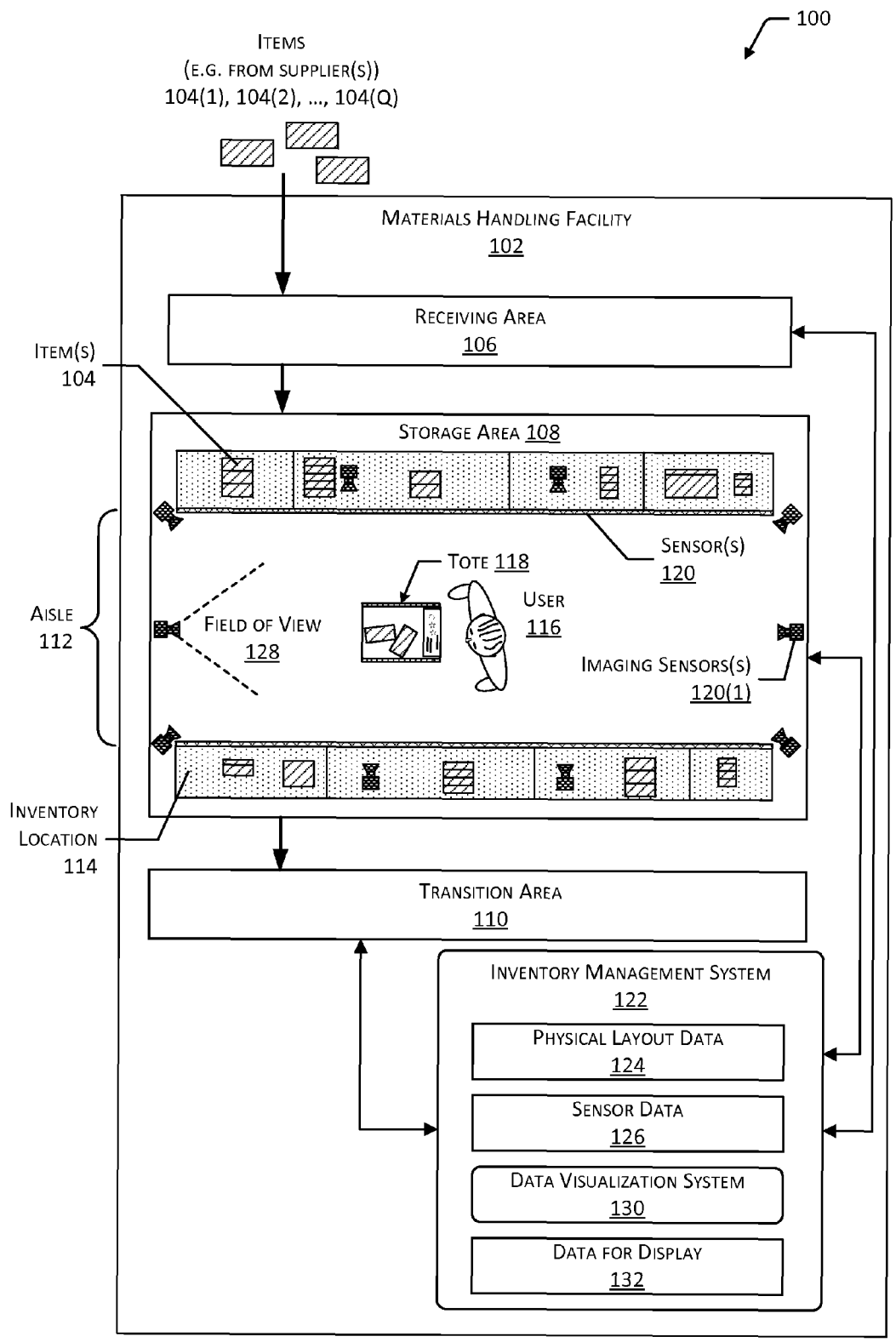
FIG. 1 is a block diagram illustrating a materials handling facility (facility) configured to use an inventory management system with a data visualization system.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

This disclosure describes systems and techniques for visualizing sensor data acquired by sensors in a facility, such as a materials handling facility. Imaging sensors, such as cameras, may be arranged within a materials handling facility (facility) to generate image data comprising one or more images. Other sensors may include touchpoint sensors, weight sensors, and so forth. In some implementations, these other sensors may produce image data. For example, a three-dimensional sensor, touchpoint sensor, and so forth, may produce image data.

The facility may include, or have access to, an inventory management system. The inventory management system may be configured to maintain information about items, users, condition of the facility, and so forth, using the image data. For example, the inventory management system may maintain information indicative of location of a user in the facility, a quantity of items stowed or held at particular inventory locations, what items a particular user is handling, environmental status of the facility, and so forth.

The inventory management system may use various techniques to process and analyze the sensor data. For example, a machine vision system may process the image data to identify objects, track objects, and so forth, at the facility or in other settings. In another example, a touch system may use information from touchpoint sensors to determine which item at an inventory location (such as a shelf) the user has interacted with. These interactions may include, but are not limited to, picking the item, placing the item, touching the item, and so forth.

It may be useful to provide a visualization of at least a portion of the sensor data for use by a human analyst (analyst), such as a software developer, hardware engineer, system maintenance personnel, and so forth. For example, during development of software to track the user within the facility, it may be advantageous to present to the software developer a visualization depicting at least a portion of the facility, image of a user of the facility who is to be tracked, and visual indicia indicative of where the machine vision system has determined the user to be. By observing this visualization and the different information being presented, the analyst may take actions intended to improve operation of the facility. For example, after viewing the visualization of the data, the analyst may change data processing parameters that affect operation or performance of the inventory management system, or a portion thereof. Similarly, during ongoing operation of the facility, visualizations may be useful to correct erroneous results produced by the inventory management system.

Described in this disclosure are systems and user interfaces configured to present visualizations of information associated with operation of the facility, such as the materials handling facility. The information presented by the visualizations may be sensor data or process data generated at least in part from the sensor data. The visualizations may include one or more of an image view, a tracking view, or a planogram view. Each of the views may have one or more overlays to present additional information. In some implementations, one view may overlay another.

The image view may present an image acquired by an imaging sensor such as a camera. In some implementations, the image view may present an aggregate image such as images acquired at different cameras that have been stitched or otherwise assembled to provide an apparently seamless image. In one implementation, an analyst may use the image view to observe how users move within the facility, determine undesirable conditions such as an obstruction in an aisle, and so forth.

The image view may be overlaid with information such as user touch association indicators, touch boundaries, and so forth. The user touch association indicators may comprise a visual indicia of a user touch association that designates a correspondence between a particular user and a particular touchpoint. For example, the visual indicia may comprise a line extending from the head of the image of the user to a touchpoint at an inventory location. The touch boundaries indicate where a touch by, or presence of, the user may result in generation of a touchpoint. For example, the touch boundary may be indicative of an area or zone of detection provided by a mechanism with respect to an inventory location. Continuing the example, the mechanism may use a lightplane in which obscuration of light by the user's hand generates touchpoint data indicative of a touch at a particular point in space. In one implementation, an analyst may use the image view overlaid with the user touch association indicators to determine which user interacted with an item or an inventory location.

The tracking view may present information indicative of a location of a user within the facility. For example, the tracking view may comprise a view of a floor plan of the facility and provide visual indicia of a location of the user on the floor plan. Overlays may be used to provide other information in the tracking view, such as a user identifier associated with the user, location identifiers associated with inventory locations, and so forth. In some implementations, the tracking view may itself overlay the image view, or portions of the image view may be presented within the tracking view. For example, a graphical representation of at least a portion of the user at the location may be presented in the tracking view. In one implementation, an analyst may use the tracking view to confirm that users are being properly tracked within the facility, to check performance of tracking algorithms, and so forth.

The planogram view provides a visual representation of a relative arrangement of items at an inventory location. The planogram view may depict the positioning of relative sizes of items arranged on a rack of shelves, from the point of view of a user facing the shelf. The planogram view may be overlaid with touchpoint indicators. The touchpoint indicators comprise visual indicia indicative of a detected touch, such as from the user. For example, an analyst may use the planogram data to resolve an ambiguity by an automated system to identify which item was picked or placed by a particular user. Overlays may be used to provide other information in the planogram view, such as user location, user identifier, and so forth.

The views provided by the visualization may comprise sensor data that is current, historical, or both. For example, the views may present real-time or near real-time information about the facility. In another example, the views may present historical data.

In one implementation, several views may be presented contemporaneously. For example, sensor data corresponding to a same interval of time may be presented to the analyst as an image view, a tracking view, and a planogram view with touchpoints that show the same interaction, such as a pick or place of an item from an inventory location.

The system may be configured to receive analyst input. For example, the input may be feedback about a hypothesis. The hypothesis may indicate one or more of a user associated with an action such as pick or place, identification of the item picked or placed, and so forth. The hypothesis may be machine generated or produced by another human operator. The analyst may use the contemporaneous presentation of several views to provide input data that validates or corrects the hypothesis. In some implementations, the input data may be provided as input to a machine learning system to train the machine learning system.

By using the visualization techniques described in this disclosure, analysts or other humans may configure, maintain, or otherwise administer the inventory management system. For example, by selecting one or more views and information overlays to be presented in conjunction with those one or more views, an analyst may be able to quickly discern sensor failures within the facility, blind spots where sensor coverage is missing or incomplete within the facility, provide input about hypotheses, and so forth. As a result, operation of the inventory management system in the facility may be improved, resulting in an improved user experience, reduced operating costs, and so forth.

Illustrative System

An implementation of a materials handling system 100 configured to store and manage inventory items is illustrated in FIG. 1. A materials handling facility 102 (facility) may comprise one or more physical structures or areas within which one or more items 104(1), 104(2), . . . , 104(Q) may be held. As used in this disclosure, letters in parenthesis such as "(Q)" indicate an integer value that may be greater than zero. The items 104 may comprise physical goods, such as books, pharmaceuticals, repair parts, electronic gear, and so forth.

The facility 102 may include one or more areas designated for different functions with regard to inventory handling. In this illustration, the facility 102 includes a receiving area 106, a storage area 108, and a transition area 110.

The receiving area 106 may be configured to accept items 104, such as from suppliers, for intake into the facility 102. For example, the receiving area 106 may include a loading dock at which trucks or other freight conveyances unload the items 104.

The storage area 108 is configured to store the items 104. The storage area 108 may be arranged in various physical configurations. In one implementation, the storage area 108 may include one or more aisles 112. The aisle 112 may be configured with, or defined by, inventory locations 114 on one or both sides of the aisle 112. The inventory locations 114(1), 114(2), . . . , 114(L) may include one or more of shelves, racks, cases, cabinets, bins, floor locations, slatwalls, pegboards, trays, dispensers, or other suitable storage mechanisms. The inventory locations 114 may be affixed to the floor or another portion of the facility's 102 structure. The inventory locations 114 may also be movable such that the arrangements of aisles 112 may be reconfigurable. In some implementations, the inventory locations 114 may be configured to move independently of an outside operator. For example, the inventory locations 114 may comprise a rack with a power source and a motor, operable by a computing device to allow the rack to move from one location within the facility 102 to another. Continuing the example, the inventory location 114 may move from one aisle 112 to another, from one location within an aisle 112 to another, and so forth. In another example, the inventory locations 114 may be configured to translate, rotate, or otherwise move relative to the facility 102.

One or more users 116(1), 116(2), . . . , 116(U) and totes 118(1), 118(2), . . . , 118(T), or other material handling apparatuses may move within the facility 102. For example, the user 116 may move about within the facility 102 to pick or place the items 104 in various inventory locations 114, placing them on the tote 118 for ease of transport. The tote 118 is configured to carry or otherwise transport one or more items 104. For example, the totes 118 may include carts, baskets, bags, bins, and so forth. In some implementations, the tote 118 may incorporate one or more inventory locations 114. For example, the tote 118 may include a bin, basket, shelf, and so forth. The totes 118 are discussed in more detail below with regard to FIG. 4.

Instead of, or in addition to the users 116, other mechanisms such as robots, forklifts, cranes, aerial drones, conveyors, elevators, pipes, and so forth, may move items 104 about the facility 102. For example, a robot may pick the item 104 from a first inventory location 114(1) and move the item 104 to a second inventory location 114(2).

One or more sensors 120 may be configured to acquire information in the facility 102. The sensors 120 may include, but are not limited to, cameras, 3D sensors, weight sensors, radio frequency (RF) receivers, temperature sensors, hygrometers, vibration sensors, and so forth. The sensors 120 may be stationary or mobile, relative to the facility 102. For example, the inventory locations 114 may contain imaging sensors 120(1), such as cameras, configured to acquire images of picking or placement of items 104 on shelves, of the users 116 in the facility 102, and so forth. In another example, the floor of the facility 102 may include weight sensors configured to determine a weight of the user 116 or other object thereupon. The sensors 120 are discussed in more detail below with regard to FIG. 2.

While the storage area 108 is depicted as having one or more aisles 112, inventory locations 114 storing the items 104, sensors 120, and so forth, it is understood that the receiving area 106, the transition area 110, or other areas of the facility 102 may be similarly equipped. Furthermore, the arrangement of the various areas within the facility 102 is depicted functionally rather than schematically. In some implementations, multiple different receiving areas 106, storage areas 108, and transition areas 110 may be interspersed rather than segregated.

The facility 102 may include, or be coupled to, an inventory management system 122. The inventory management system 122 is configured to interact with users 116 or devices such as sensors 120, robots, material handling equipment, computing devices, and so forth, in one or more of the receiving area 106, the storage area 108, or the transition area 110.

The facility 102 may be configured to receive different kinds of items 104 from various suppliers and to store them until a customer orders or retrieves one or more of the items 104. A general flow of items 104 through the facility 102 is indicated by the arrows of FIG. 1. Specifically, as illustrated in this example, items 104 may be received from one or more suppliers, such as manufacturers, distributors, wholesalers, and so forth, at the receiving area 106. In various implementations, the items 104 may include merchandise, commodities, perishables, or any suitable type of item 104, depending on the nature of the enterprise that operates the facility 102.

Upon being received from a supplier at the receiving area 106, the items 104 may be prepared for storage. For example, items 104 may be unpacked or otherwise rearranged. The inventory management system 122 may include one or more software applications executing on a computer system to provide inventory management functions. These inventory management functions may include maintaining information indicative of the type, quantity, condition, cost, location, weight, or any other suitable parameters with respect to the items 104. The items 104 may be stocked, managed, or dispensed in terms of countable, individual units or multiples, such as packages, cartons, crates, pallets, or other suitable aggregations. Alternatively, some items 104, such as bulk products, commodities, and so forth, may be stored in continuous or arbitrarily divisible amounts that may not be inherently organized into countable units. Such items 104 may be managed in terms of measurable quantity such as units of length, area, volume, weight, time, duration, or other dimensional properties characterized by units of measurement. Generally speaking, a quantity of an item 104 may refer to either a countable number of individual or aggregate units of an item 104 or a measurable amount of an item 104, as appropriate.

After arriving through the receiving area 106, items 104 may be stored within the storage area 108. In some implementations, like items 104 may be stored or displayed together in the inventory locations 114 such as in bins, on shelves, hanging from pegboards, and so forth. In this implementation, all items 104 of a given kind are stored in one inventory location 114. In other implementations, like items 104 may be stored in different inventory locations 114. For example, to optimize retrieval of certain items 104 having frequent turnover within a large physical facility 102, those items 104 may be stored in several different inventory locations 114 to reduce congestion that might occur at a single inventory location 114.

When a customer order specifying one or more items 104 is received, or as a user 116 progresses through the facility 102, the corresponding items 104 may be selected or "picked" from the inventory locations 114 containing those items 104. In various implementations, item picking may range from manual to completely automated picking. For example, in one implementation, a user 116 may have a list of items 104 they desire and may progress through the facility 102 picking items 104 from inventory locations 114 within the storage area 108 and placing those items 104 into a tote 118. In other implementations, employees of the facility 102 may pick items 104 using written or electronic pick lists derived from customer orders. These picked items 104 may be placed into the tote 118 as the employee progresses through the facility 102.

After items 104 have been picked, they may be processed at a transition area 110. The transition area 110 may be any designated area within the facility 102 where items 104 are transitioned from one location to another or from one entity to another. For example, the transition area 110 may be a packing station within the facility 102. When the items 104 arrive at the transition area 110, the items 104 may be transitioned from the storage area 108 to the packing station. Information about the transition may be maintained by the inventory management system 122.

In another example, if the items 104 are departing the facility 102, a list of the items 104 may be obtained and used by the inventory management system 122 to transition responsibility for, or custody of, the items 104 from the facility 102 to another entity. For example, a carrier may accept the items 104 for transport with that carrier accepting responsibility for the items 104 indicated in the list. In another example, a customer may purchase or rent the items 104 and remove the items 104 from the facility 102.

During use of the facility 102, the user 116 may move about the facility 102 to perform various tasks, such as picking or placing the items 104 in the inventory locations 114. The user 116, operator of the facility 102, or others may benefit from information or actions which are based on data obtained from the one or more sensors 120. For example, a pick list may be presented to the user 116 for items 104 that are in inventory locations 114 near a current location of the user 116 in the facility 102.

The inventory management system 122 may use physical layout data 124 during operation. The physical layout data 124 comprises information about the physical configuration of the facility 102 or portions thereof. For example, the physical layout data 124 may include electronic representations of the physical structures in the facility 102, such as computer aided design (CAD) data of the aisle 112 configurations, inventory locations 114, information about which items 104 are in what inventory locations 114, real coordinates of the sensors 120, and so forth. The physical layout data 124 may include information about the presence of walls, heating, ventilation, and air conditioning (HVAC) equipment, location of doors and windows, furniture, and so forth.

The inventory management system 122 may access the sensor data 126 comprising information acquired by the one or more sensors 120. For example, sensor data 126 may comprise images acquired by the imaging sensors 120(1), touchpoint data from touchpoint sensors, weight data from weight sensors, and so forth.

Each imaging sensor 120(1) may exhibit a field of view 128 which includes a portion of a scene in the facility 102. For example, the field of view 128 of an overhead imaging sensor 120(1) may comprise a portion of the aisle 112.

The inventory management system 122 may use the physical layout data 124 and the sensor data 126 to generate processed data about the facility 102. For example, the inventory management system 122 may use image data from the imaging sensors 120(1), from 3D sensors 120(2), and so forth, to generate tracking data as the user 116 moves throughout the facility 102. The inventory management system 122 may also use touchpoint data from touchpoint sensors 120(14) to determine which item 104 the user 116 has interacted with, and so forth.

A data visualization system 130 may be configured to generate data for display 132. The data visualization system 130 may accept as input sensor data 126 or processed data based at least in part on the sensor data 126. The data for display 132 may comprise one or more of images, instructions configured to generate graphical representations, and so forth. For example, the data visualization system 130 may generate data for display 132 comprising one or more of: an image file such as a bitmap, drawing instructions such as a Hypertext Markup Language (HTML) "<canvas>" element, and so forth. The data for display 132 may be provided to one or more computing devices such as a desktop computer, tablet computer, smartphone, and so forth, for presentation.

In some implementations, the data visualization system 130 may generate an aggregate image. The aggregate image may comprise images acquired from a plurality of imaging sensors 120(1) that may be "stitched" together. For example, the aggregate image may comprise images acquired from overhead imaging sensors 120(1) that have been combined to provide an overhead view of at least a portion of the facility 102. The process of combining may include changes to the images such as cropping, warping, re-orienting, and so forth. In some situations, the aggregate image may be complete, such as an image of the entire facility or portion thereof. In other situations, the aggregate image may be incomplete, having areas of missing data, such as where an imaging sensor 120(1) is nonfunctional.

The data visualization system 130 and various implementations of the views and overlays that may be presented from the data for display 132 are discussed below in more detail. For example, the data visualization system 130 may generate data for display 132 that presents image views, tracking views, planogram views, user identifiers, item identifiers, touchpoint indicators, and so forth. The data visualization system 130 may be configured to process and provide as data for display 132 the sensor data 126 occurring within a specified interval of time. For example, different sensors 120 may acquire or sample data at different sampling intervals. A weight sensor may acquire weight data once every second, while an imaging sensor 120(1) may acquire 30 frames per second of image data. Continuing the example, the data visualization system 130 may be configured to access and use samples of sensor data 126 that occurred within a 2 second interval, allowing for the capture of at least one sample of weight data and about 60 frames of image data that occurred contemporaneously with the weight reading. In other implementations, the data visualization system 130 may use the most recently collected samples, last "n" number of samples (where "n" is a positive integer), and so forth, to provide the data for display 132.

The data for display 132 may be based on current data or previously stored data. For example, the data visualization system 130 may be configured to provide data for display 132 in near real time, such that sensor data 126 within an interval of the last few seconds is presented. In another example, the data visualization system 130 may be configured to provide data for display 132 of an interval of time associated with a previously stored event, such as a pick or place that occurred yesterday.

The data visualization system 130 may be configured to accept input data from an analyst or other source. In one implementation, the data visualization system 130 may provide data for display 132 that includes one or more hypotheses for assessment by the analyst. A hypothesis may indicate one or more of a user associated with an action such as pick or place, identification of the item 104 picked or placed, and so forth. The hypothesis may be machine generated or produced by another human operator. For example, the inventory management system 122 may generate a hypothesis that the user 116(2) has picked the item 104(3) from the inventory location 114(13). The data visualization system 130 may be used to generate data for display 132 that facilitates the analyst in assessing whether the hypothesis is correct. The input data received from the analyst may then be used for operation of the inventory management system 122. Continuing the example, the analyst may indicate that another user 116(5) was the person who picked the item 104(3) from the inventory location 114(13). As a result of this input data, the inventory management system 122 may allocate the pick of the item 104(3) to the user 116(5).

The data visualization system 130 may be used to facilitate development, configuration, maintenance, administration, or other aspects of the inventory management system 122. By providing data for display 132, which may be used to present information graphically to an analyst, the analyst may be able to quickly and effectively assess information from multiple sensors 120 in the facility 102.

Figure 2:
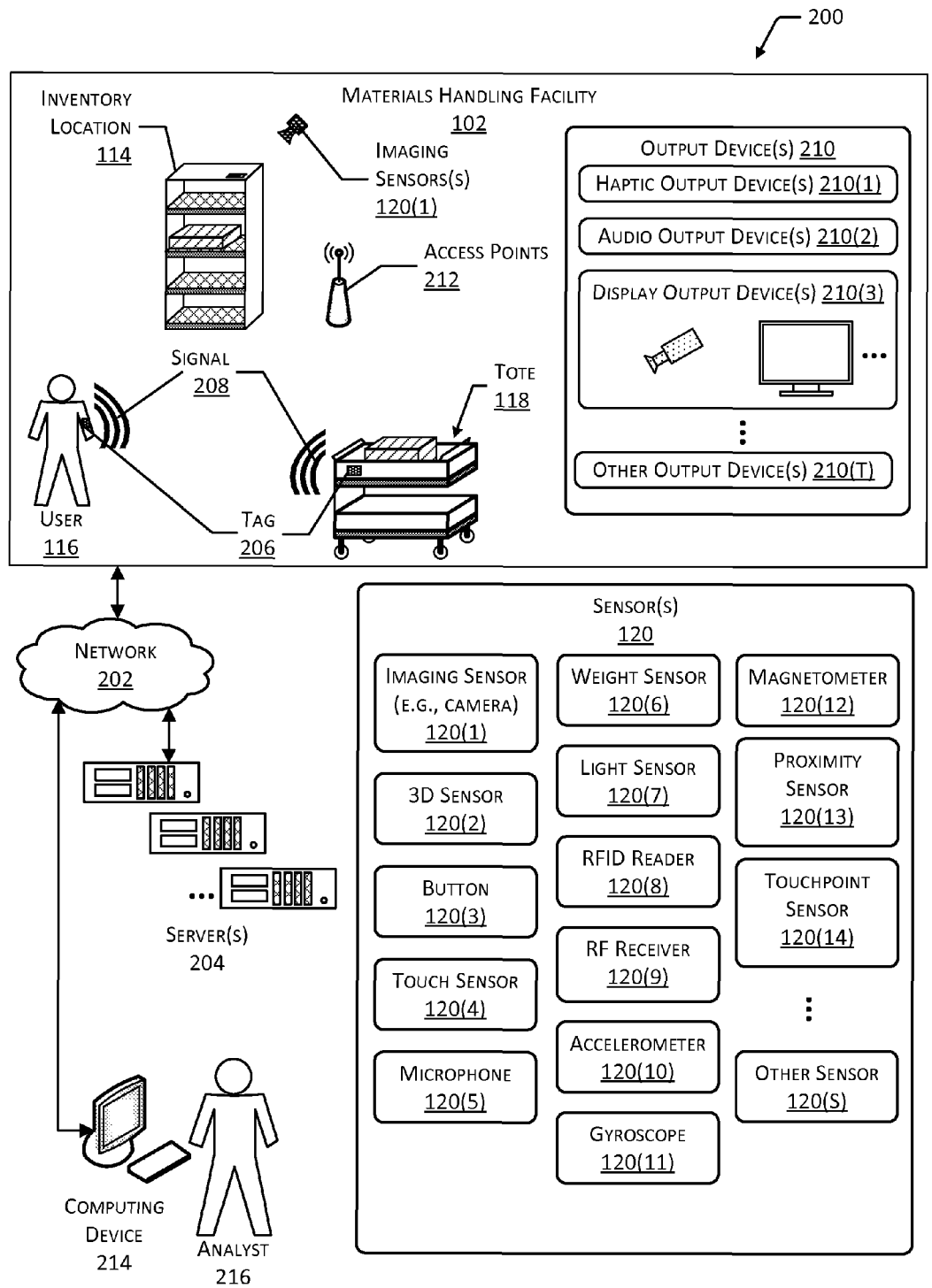
FIG. 2 is a block diagram illustrating additional details of the facility, according to some implementations.

FIG. 2 is a block diagram 200 illustrating additional details of the facility 102, according to some implementations. The facility 102 may be connected to one or more networks 202, which in turn connect to one or more servers 204. The network 202 may include private networks, public networks such as the Internet, or a combination thereof. The network 202 may utilize wired technologies (e.g., wires, fiber optic cable, and so forth), wireless technologies (e.g., radio frequency, infrared, acoustic, optical, and so forth), or other connection technologies. The network 202 is representative of any type of communication network, including one or more of data networks or voice networks.

The servers 204 may be configured to execute one or more modules or software applications associated with the inventory management system 122. While the servers 204 are illustrated as being in a location outside of the facility 102, in other implementations, at least a portion of the servers 204 may be located at the facility 102. The servers 204 are discussed in more detail below with regard to FIG. 3.

The users 116, the totes 118, or other objects in the facility 102 may be equipped with one or more tags 206. The tags 206 are configured to emit a signal 208. In one implementation, the tag 206 may be a radio frequency identification (RFID) tag configured to emit a RF signal 208 upon activation by an external signal. For example, the external signal may comprise a radio frequency signal or a magnetic field configured to energize or activate the RFID tag 206. In another implementation, the tag 206 may comprise a transmitter and a power source configured to power the transmitter. For example, the tag 206 may comprise a Bluetooth® Low Energy (BLE) transmitter and battery. In other implementations, the tag 206 may use other techniques to indicate presence of the tag 206 to a corresponding sensor 120 or detector. For example, the tag 206 may be configured to generate an ultrasonic signal 208 that is detected by corresponding acoustic receivers. In yet another implementation, the tag 206 may be configured to emit an optical signal 208.

The inventory management system 122 may be configured to use the tags 206 for one or more of identification of the object, determining a location of the object, and so forth. For example, the users 116 may wear tags 206, the totes 118 may have tags 206 affixed, and so forth, that may be read and, based at least in part on signal strength, used to determine identity and location.

Generally, the inventory management system 122 or other systems associated with the facility 102 may include any number and combination of input components, output components, and servers 204.

The one or more sensors 120 may be arranged at one or more locations within the facility 102. For example, the sensors 120 may be mounted on or within a floor, wall, or ceiling, at an inventory location 114, on the tote(s) 118, may be carried or worn by the user(s) 116, and so forth.

The sensors 120 may include one or more imaging sensors 120(1). These imaging sensors 120(1) may include cameras configured to acquire images of a scene. The imaging sensors 120(1) may be configured to detect light in one or more wavelengths including, but not limited to, terahertz, infrared, visible, ultraviolet, and so forth. For example, the imaging sensors 120(1) may include a "red-green-blue" or "RGB" camera configured to produce visible light image date. The inventory management system 122 may use image data acquired by the imaging sensors 120(1) during operation of the facility 102. For example, the inventory management system 122 may identify items 104, users 116, totes 118, and so forth, based at least in part on their appearance within the image data.

In some implementations, the imaging sensors 120(1) may be used to generate touchpoint data. For example, the images acquired by the imaging sensors 120(1) may be used to determine where a user 116 has touched an item 104 at an inventory location 114. Continuing the example, the images may be processed to identify a hand of the user 116, determine a corresponding point in space in which the hand appears, and determine the inventory location 114 associated with that point in space.

One or more 3D sensors 120(2) may also be included in the sensors 120. The 3D sensors 120(2) are configured to acquire spatial or three-dimensional data, such as depth information, about objects within a sensor field of view 128. The 3D sensors 120(2) may include range cameras, lidar systems, sonar systems, radar systems, structured light systems, stereo vision systems, optical interferometry systems, coded aperture systems, and so forth.

The inventory management system 122 may use the three-dimensional data acquired to identify objects, determine one or more of a location, orientation, or position of an object, and so forth. The location may be described as where in space within the facility 102 an object is. For example, the location may be specified as X and Y coordinates relative to an origin, where X and Y are mutually orthogonal. In comparison, orientation may be indicative of a direction the object (or a portion thereof) is facing. For example, the orientation may be that the user 116 is facing south. Position may provide information indicative of a physical configuration or pose of the object, such as the arms of the user 116 are stretched out to either side. Pose may provide information on a relative configuration of one or more elements of an object. For example, the pose of the user's 116 hand may indicate whether the hand is open or closed. In another example, the pose of the user 116 may include how the user 116 is holding an item 104. In some implementations, the sensor data 126 produced by the 3D sensors 120(2) may be provided as image data. For example, the image data may represent the distance of an object as a color, such that instead of or in addition to a color value for that pixel, the data may indicate a distance.

In some implementations, the 3D sensors 120(2) may be used to generate touchpoint data. For example, the touchpoint data may be based on three-dimensional data that indicates a user 116 is proximate to, or in contact with, an item 104 at an inventory location 114.

One or more buttons 120(3) may also be included in the sensors 120 and be configured to accept input from the user 116. The buttons 120(3) may comprise mechanical, capacitive, optical, or other mechanisms. For example, the buttons 120(3) may comprise mechanical switches configured to accept an applied force from a touch of the user 116 to generate an input signal. The inventory management system 122 may use data from the buttons 120(3) to receive information from the user 116. For example, the buttons 120(3) may be used to accept input from a user 116 such as a username and password associated with an account.

The sensors 120 may include one or more touch sensors 120(4). The touch sensors 120(4) may use resistive, capacitive, surface capacitance, projected capacitance, mutual capacitance, optical, Interpolating Force-Sensitive Resistance (IFSR), or other mechanisms to determine the point of a touch or near-touch. For example, the IFSR may comprise a material configured to change electrical resistance responsive to an applied force. The point of that change in electrical resistance within the material may indicate the point of the touch. The inventory management system 122 may use data from the touch sensors 120(4) to receive information from the user 116. For example, the touch sensor 120(4) may be integrated with the tote 118 to provide a touchscreen with which the user 116 may select from a menu one or more particular items 104 for picking, enter a manual count of items 104 at an inventory location 114, and so forth.

The sensors 120 may include one or more microphones 120(5) that may be configured to acquire audio data indicative of sound present in the environment. The sound may include user speech uttered by the user 116. In some implementations, arrays of microphones 120(5) may be used. These arrays may implement beamforming or other techniques to provide for directionality of gain. The inventory management system 122 may use the one or more microphones 120(5) to accept voice input from the users 116, determine the location of one or more users 116 in the facility 102, and so forth.

One or more weight sensors 120(6) may be configured to measure the weight of a load, such as the item 104, the user 116, the tote 118, and so forth. The weight sensors 120(6) may be configured to measure the weight of the load at one or more of the inventory locations 114, the tote 118, on the floor of the facility 102, and so forth. The weight sensors 120(6) may include one or more sensing mechanisms to determine weight of a load. These sensing mechanisms may include piezoresistive devices, piezoelectric devices, capacitive devices, electromagnetic devices, optical devices, potentiometric devices, microelectromechanical devices, load cells, pneumatic pressure sensors, and so forth. The sensing mechanisms may operate as transducers that generate one or more signals based on an applied force, such as that of the load due to gravity.

The sensors 120 may include one or more light sensors 120(7). The light sensors 120(7) may be configured to provide information associated with ambient lighting conditions such as a level of illumination. Information acquired by the light sensors 120(7) may be used by the inventory management system 122 to adjust a level, intensity, or configuration of an output device such as a display.

One more radio frequency identification (RFID) readers 120(8), near field communication (NFC) systems, and so forth, may also be provided as sensors 120. For example, the RFID readers 120(8) may be configured to read the RF tags 206. Information acquired by the RFID reader 120(8) may be used by the inventory management system 122 to identify an object associated with the RF tag 206 such as the item 104, the user 116, the tote 118, and so forth.

One or more RF receivers 120(9) may also be included as sensors 120. In some implementations, the RF receivers 120(9) may be part of transceiver assemblies. The RF receivers 120(9) may be configured to acquire RF signals 208 associated with Wi-Fi™ Bluetooth®, ZigBee®, 3G, 4G, LTE, or other wireless data transmission technologies. The RF receivers 120(9) may provide information associated with data transmitted via radio frequencies, signal strength of RF signals 208, and so forth. For example, information from the RF receivers 120(9) may be used by the inventory management system 122 to determine a location of an RF source, such as a device carried by the user 116.

The sensors 120 may include one or more accelerometers 120(10), which may be worn or carried by the user 116, mounted to the tote 118, and so forth. The accelerometers 120(10) may provide information such as the direction and magnitude of an imposed acceleration. Data such as rate of acceleration, determination of changes in direction, speed, and so forth, may be determined using the accelerometers 120(10).

A gyroscope 120(11) may provide information indicative of rotation of an object affixed thereto. For example, the tote 118 or other objects or devices may be equipped with a gyroscope 120(11) to provide data indicative of a change in orientation.

A magnetometer 120(12) may be used to determine a heading by measuring ambient magnetic fields, such as the terrestrial magnetic field. The magnetometer 120(12) may be worn or carried by the user 116, mounted to the tote 118, and so forth. For example, the magnetometer 120(12) as worn by the user 116(1) may act as a compass and provide information indicative of which way the user 116(1) is facing.

A proximity sensor 120(13) may be used to determine presence of an object, such as the user 116, the tote 118, and so forth. The proximity sensors 120(13) may use optical, electrical, ultrasonic, electromagnetic, or other techniques to determine a presence of an object. In some implementations, the proximity sensors 120(13) may use an optical emitter and an optical detector to determine proximity. For example, an optical emitter may emit light, a portion of which may then be reflected by the object back to the optical detector to provide an indication that the object is proximate to the proximity sensor 120(13). In other implementations, the proximity sensors 120(13) may comprise a capacitive proximity sensor 120(13) configured to provide an electrical field and determine a change in electrical capacitance due to presence or absence of an object within the electrical field.

The proximity sensors 120(13) may be configured to provide sensor data 126 indicative of one or more of a presence or absence of an object, a distance to the object, characteristics of the object, and so forth. An optical proximity sensor 120(13) may use time-of-flight (ToF), structured light, interferometry, or other techniques to generate the distance data. For example, ToF determines a propagation time (or "round-trip" time) of a pulse of emitted light from an optical emitter or illuminator that is reflected or otherwise returned to an optical detector. By dividing the propagation time in half and multiplying the result by the speed of light in air, the distance to an object may be determined. In another implementation, a structured light pattern may be provided by the optical emitter. A portion of the structured light pattern may then be detected on the object using an imaging sensor 120(1) such as a camera. Based on an apparent distance between the features of the structured light pattern, the distance to the object may be calculated. Other techniques may also be used to determine distance to the object. In another example, the color of the reflected light may be used to characterize the object, such as skin, clothing, tote 118, and so forth. In some implementations, a proximity sensor 120(13) may be installed at the inventory location 114.

A touchpoint sensor 120(14) is configured to generate touchpoint data indicative of a touch by one object with another, or proximity of two objects deemed to constitute a touch. For example, the touchpoint data may be indicative of a touch provided by a hand or a portion of the hand of the user 116 coming into physical contact with an item 104 or an inventory location 114. In another example, the touch may comprise the two objects being proximate to one another, such as the hand or the portion of the hand of the user 116 coming to within 6 centimeters (cm) of the item 104 or the inventory location 114. The touchpoint sensors 120(14) may be configured to generate touchpoint data for a particular inventory location 114 (such as a shelf on a rack), a grouping of inventory locations 114 (such as the rack of shelves), and so forth.

In one implementation, the touchpoint sensor 120(14) may utilize a linear array of light emitters and a corresponding linear array of light detectors. For example, the light emitters may comprise a line of infrared light emitting diodes (LEDs) or vertical cavity surface emitting lasers (VCSELs) that are arranged above a top shelf in front of the inventory location 114, while the light detectors comprise a line of photodiode sensitive to infrared light arranged below the light emitters. The light emitters produce a "lightplane" or sheet of infrared light that is then detected by the light detectors. An object passing through the lightplane may decrease the amount of light falling upon the light detectors. For example, the user's 116 hand would prevent some light from the light emitters from reaching a corresponding light detector. As a result, a position along the linear array of the object may be determined. This position may be expressed as the touchpoint data, with the touchpoint being indicative of the intersection between the hand of the user 116 and the sheet of infrared light. In some implementations, a pair of touchpoint sensors 120(14) may be arranged at right angles relative to one another to provide two-dimensional touchpoint data indicative of a position of touch in a plane.

The sensors 120 may include other sensors 120(S) as well. For example, the other sensors 120(S) may include ultrasonic rangefinders, thermometers, barometric sensors, hygrometers, vibration sensors, biometric input devices, and so forth. Continuing the example, the biometric input devices may include, but not limited to, fingerprint readers, palm scanners, and so forth.

Output devices 210 may also be provided in the facility 102. The output devices 210 may be configured to generate signals that may be perceived by the user 116.

Haptic output devices 210(1) may be configured to provide a signal that results in a tactile sensation to the user 116. The haptic output devices 210(1) may use one or more mechanisms such as electrical stimulation or mechanical displacement to provide the signal. For example, the haptic output devices 210(1) may be configured to generate a modulated electrical signal that produces an apparent tactile sensation in one or more fingers of the user 116. In another example, the haptic output devices 210(1) may comprise piezoelectric or rotary motor devices configured to provide a vibration that may be felt by the user 116.

One or more audio output devices 210(2) may be configured to provide acoustic output. The acoustic output includes one or more of infrasonic sound, audible sound, or ultrasonic sound. The audio output devices 210(2) may use one or more mechanisms to generate the sound. These mechanisms may include, but are not limited to, the following: voice coils, piezoelectric elements, magnetorestrictive elements, electrostatic elements, and so forth. For example, a piezoelectric buzzer or a speaker may be used to provide acoustic output.

The display output devices 210(3), such as a display panel, may be configured to provide output that may be seen by the user 116 or detected by a light-sensitive detector such as an imaging sensor 120(1) or light sensor 120(7). The output from the display output devices 210(3) may be monochrome or color. The display output devices 210(3) may be emissive, reflective, or both emissive and reflective. An emissive display output device 210(3) is configured to emit light during operation. For example, a LED is an emissive display output device 210(3). In comparison, a reflective display output device 210(3) relies on ambient light to present an image. For example, an electrophoretic display is a reflective display output device 210(3). Backlights or front lights may be used to illuminate the reflective display output device 210(3) to provide visibility of information in conditions where the ambient light levels are low.

Mechanisms of the display output devices 210(3) may include liquid crystal displays, transparent organic LEDs, electrophoretic displays, image projectors, or other display mechanisms. The other display mechanisms may include, but are not limited to, micro-electromechanical systems (MEMS), spatial light modulators, electroluminescent displays, quantum dot displays, liquid crystal on silicon (LCOS) displays, cholesteric displays, interferometric displays, and so forth. These mechanisms are configured to emit light, modulate incident light emitted from another source, or both.

The display output devices 210(3) may be configured to present images. For example, the display output devices 210(3) may comprise a pixel-addressable display. The image may comprise at least a two-dimensional array of pixels or a vector representation of an at least two-dimensional image.

In some implementations, the display output devices 210(3) may be configured to provide non-image data, such as text characters, colors, and so forth. For example, a segmented electrophoretic display, segmented LED, and so forth, may be used to present information such as a stock keeping unit (SKU) number. The display output devices 210(3) may also be configurable to vary the color of the text, such as using multicolor LED segments.

In some implementations, the display output devices 210(3) may be configurable to provide image or non-image output. For example, an electrophoretic display output device 210(3) with addressable pixels may be used to present images of text information or all of the pixels may be set to a solid color to provide a colored panel.

The display output devices 210(3) may be configured to maintain presentation of an image without ongoing application of electrical power. For example, the electrophoretic display output device 210(3) may be able to maintain a particular configuration of electrophoretic elements in the absence of power, allowing ongoing presentation when power is removed. In another example, cholesteric displays may be configured to continue presentation after power is removed. In some implementations, these displays may be referred to a "stable" or "bistable" displays.

The output devices 210 may include hardware processors, memory, and other elements configured to present a user interface. In one implementation, the display output devices 210(3) may be arranged along the edges of inventory locations 114.

Other output devices 210(T) may also be present at the facility 102. The other output devices 210(T) may include lights, scent/odor dispensers, document printers, three-dimensional printers or fabrication equipment, and so forth. For example, the other output devices 210(T) may include lights that are located on the inventory locations 114, the totes 118, and so forth.

The facility 102 may include one or more access points 212 configured to establish one or more wireless networks. The access points 212 may use Wi-Fi™, NFC, Bluetooth®, or other technologies to establish wireless communications between a device and the network 202. The wireless networks allow the devices to communicate with one or more of the inventory management system 122, the sensors 120, the tags 206, communication devices of the totes 118, or other devices. In other implementations, a wired networking infrastructure may be implemented. For example, cabling may be used to provide Ethernet local area network connectivity.

Coupled to the network 202 may be one or more computing devices 214. The computing devices 214 may include desktop computers, tablet computers, smart phones, and so forth. An analyst 216 may use the computing device 214 to access one or more functions associated with the facility 102. For example, the analyst 216 may use the computing device 214 to present the data for display 132. In another example, the analyst 216 may use the computing device 214 to provide input to the inventory management system 122 or other systems. The analyst 216 may comprise a software developer, hardware developer, system administrator, maintenance personnel, and so forth.

Figure 3:
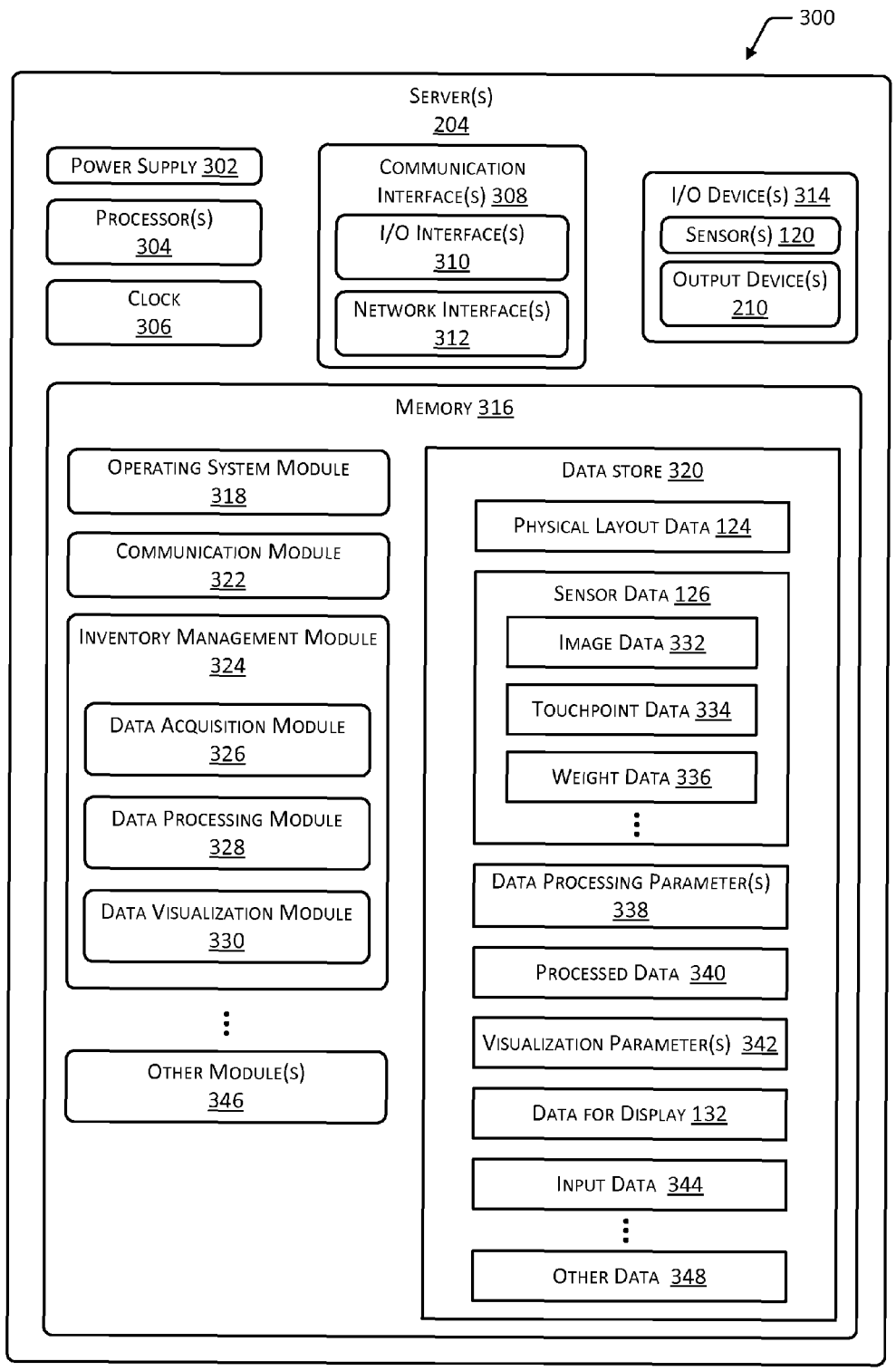
FIG. 3 illustrates a block diagram of a server configured to support operation of the facility, according to some implementations.

FIG. 3 illustrates a block diagram 300 of a server 204 configured to support operation of the facility 102, according to some implementations. The server 204 may be physically present at the facility 102, may be accessible by the network 202, or a combination of both. The server 204 does not require end-user knowledge of the physical location and configuration of the system that delivers the services. Common expressions associated with the server 204 may include "on-demand computing", "software as a service (SaaS)", "platform computing", "network-accessible platform", "cloud services", "data centers", and so forth. Services provided by the server 204 may be distributed across one or more physical or virtual devices.

One or more power supplies 302 are configured to provide electrical power suitable for operating the components in the server 204. The server 204 may include one or more hardware processors 304 (processors) configured to execute one or more stored instructions. The processors 304 may comprise one or more cores. The cores may be of one or more types. For example, the processors 304 may include application processor units, graphic processing units, and so forth. One or more clocks 306 may provide information indicative of date, time, ticks, and so forth. For example, the processor 304 may use data from the clock 306 to generate timestamps, trigger a preprogrammed action, and so forth.

The server 204 may include one or more communication interfaces 308, such as input/output (I/O) interfaces 310, network interfaces 312, and so forth. The communication interfaces 308 enable the server 204, or components thereof, to communicate with other devices or components. The communication interfaces 308 may include one or more I/O interfaces 310. The I/O interfaces 310 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 310 may couple to one or more I/O devices 314. The I/O devices 314 may include input devices such as one or more of a sensor 120, keyboard, mouse, scanner, and so forth. The I/O devices 314 may also include output devices 210 such as one or more of a display output device 210(3), printer, audio speaker, and so forth. In some embodiments, the I/O devices 314 may be physically incorporated with the server 204 or may be externally placed.

The network interfaces 312 are configured to provide communications between the server 204 and other devices, such as totes 118, routers, access points 212, and so forth. The network interfaces 312 may include devices configured to couple to personal area networks (PANs), local area networks (LANs), wide area networks (WANs), and so forth. For example, the network interfaces 312 may include devices compatible with Ethernet, Wi-Fi®, Bluetooth®, ZigBee®, and so forth.

The server 204 may also include one or more busses or other internal communications hardware or software that allow for the transfer of data between the various modules and components of the server 204.

As shown in FIG. 3, the server 204 includes one or more memories 316. The memory 316 comprises one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 316 may provide storage of computer-readable instructions, data structures, program modules, and other data for the operation of the server 204. A few example functional modules are shown stored in the memory 316, although the same functionality may alternatively be implemented in hardware, firmware, or as a system on a chip (SoC).

The memory 316 may include at least one operating system (OS) module 318. The OS module 318 is configured to manage hardware resource devices such as the communication interfaces 308, the I/O interfaces 310, the I/O devices 314, the communication interfaces 308, and provide various services to applications or modules executing on the processors 304. The OS module 318 may implement a variant of the FreeBSD® operating system as promulgated by the FreeBSD Project; other UNIX™ or UNIX-like variants; a variation of the Linux™ operating system as promulgated by Linus Torvalds; the Windows® operating system from Microsoft Corporation of Redmond, Wash., USA; and so forth.

Also stored in the memory 316 may be a data store 320 and one or more of the following modules. These modules may be executed as foreground applications, background tasks, daemons, and so forth. The data store 320 may use a flat file, database, linked list, tree, executable code, script, or other data structure to store information. In some implementations, the data store 320 or a portion of the data store 320 may be distributed across one or more other devices including the servers 204, network attached storage devices, and so forth.

A communication module 322 may be configured to establish communications with one or more of the totes 118, sensors 120, other servers 204, or other devices. The communications may be authenticated, encrypted, and so forth.

The memory 316 may store an inventory management module 324. The inventory management module 324 may be configured to provide the inventory functions as described herein with regard to the inventory management system 122. For example, the inventory management module 324 may track items 104 between different inventory locations 114, to and from the totes 118, and so forth. Operation of the inventory management module 324 may use sensor data 126 obtained from the sensors 120.

The inventory management module 324 may include one or more of a data acquisition module 326, a data processing module 328, or a data visualization module 330. The data acquisition module 326 may be configured to acquire and access information associated with operation of the facility 102. For example, the data acquisition module 326 may acquire the sensor data 126 from the sensors 120.

In some implementations, the data processing module 328 may perform one or more image processing functions on image data 332 using one or more of the following tools or techniques. The image data 332 may be acquired by one or more of the sensors 120. For example, the image data 332 may be produced by the imaging sensors 120(1), 3D sensors 120(2), touchpoint sensors 120(14), and so forth. The image processing functions may be performed, at least in part, using one or more tools available in the OpenCV library as developed by Intel Corporation of Santa Clara, Calif., USA; Willow Garage of Menlo Park, Calif., USA; and Itseez of Nizhny Novgorod, Russia, with information available at www.opencv.org. In another implementation, functions available in the OKAO machine vision library as promulgated by Omron Corporation of Kyoto, Japan, may be used to process the image data 332. In another implementation, the EyeFace SDK as promulgated by Eyedea Recognition Ltd. of Prague, Czech Republic, may be used to process the image data 332. The OpenBR library and tools as originated by MITRE Corporation of Bedford, Mass., USA, and McLean, Va., USA, and promulgated by the OpenBR group at openbiometrics.org may also be used in some implementation for image processing.

In some implementations, the data processing module 328 may perform facial recognition. For example, facial recognition may be used to identify the user 116. Facial recognition may include analyzing facial characteristics that are indicative of one or more facial features in an image, three-dimensional data, or both. For example, the face of the user 116 may be detected within one or more of images in the image data 332. The facial features include measurements of, or comparisons between, facial fiducials or ordinal points. The facial features may include eyes, mouth, lips, nose, chin, ears, face width, skin texture, three-dimensional shape of the face, presence of eyeglasses, and so forth. In some implementations, the facial characteristics may include facial metrics. The facial metrics indicate various ratios of relative sizes and spacing of the facial features. For example, the facial metrics may include a ratio of interpupillary distance to facial width, ratio of eye width to nose width, and so forth. In some implementations, the facial characteristics may comprise a set of eigenvectors by using principal component analysis (PCA) on a set of images. These eigenvectors as descriptive of a human face may be known as "eigenfaces" or "eigenimages".

The identification process using facial recognition may include comparing the eigenvectors of the image with those previously stored as facial characteristics to determine identity of the user 116. For example, the face of the user 116 may be identified using the "FaceRecognizer" class of the OpenCV library. The results may then be stored as identification data (not shown) in the data store 320.

In other implementations, other techniques may be used to recognize faces. Previously stored registration data may associate particular facial characteristics with a particular identity, such as represented by a user account. For example, the particular pattern of eigenvectors in the image may be sought in the previously stored data, and matches within a threshold tolerance may be determined to indicate identity of the user 116. The eigenvectors or other measurements may be compared with previously stored characteristics to determine the identity of the user 116 in the image or to distinguish one user 116 from another.

The data processing module 328 may perform clothing recognition to analyze images to determine what articles of clothing, ornamentation, and so forth, the user 116 is wearing or carrying in the facility 102. For example, clothing recognition may be used to identify the user 116. Skin and hair detection algorithms may be used to classify portions of the image that are associated with the user's 116 skin or hair. Items that are not skin and hair may be classified into various types of articles of clothing such as shirts, hats, pants, bags, and so forth. The articles of clothing may be classified according to function, position, manufacturer, and so forth. Classification may be based on clothing color, texture, shape, position on the user 116, and so forth. For example, classification may designate an article of clothing worn on the torso of a user 116 as a "blouse" while color or pattern information may be used to determine a particular designer or manufacturer. The determination of the article of clothing may use a comparison of information from the images with previously stored data. Continuing the example, the pattern of the blouse may have been previously stored along with information indicative of the designer or manufacturer.

In some implementations, identification of the user 116 may be based on the particular combination of classified articles of clothing. The clothing may be used to identify the user 116 or to distinguish one user 116 from another. For example, the user 116(1) may be distinguished from the user 116(2) based at least in part on the user 116(1) wearing a hat and a red shirt while the user 116(2) is not wearing a hat and is wearing a blue shirt.

The data processing module 328 may use gait recognition techniques to analyze one or more of images, three-dimensional data, or other data, to assess how a user 116 moves over time. The user 116 may be identified at least in part by their gait. Gait comprises a recognizable pattern of movement of the user's 116 body that is affected by height, age, and other factors. Gait recognition may analyze the relative position and motion of limbs of the user 116. Limbs may include one or more arms, legs, and (in some implementations) the head. In one implementation, edge detection techniques may be used to extract a position of one or more limbs of the user 116 in the series of images. For example, a main leg angle of a user's 116 leg may be determined, and based on the measurement of this main leg angle over time and from different points-of-view, a three-dimensional model of the leg motion may be generated. The change in position over time of the limbs may be determined and compared with previously stored information to determine an identity of the user 116 or to distinguish one user 116 from another.

In some implementations, identity may be based on a combination of these or other recognition techniques. For example, the user 116 may be identified based on clothing recognition, gait recognition, facial recognition, detection of tags 206, weight data 336 from weight sensors 120(6), and so forth. The different recognition techniques may be used in different situations or in succession. For example, clothing recognition and gait recognition may be used at greater distances between the user 116 and the imaging sensors 120(1) or when the user's 116 face is obscured from view by an imaging sensor 120(1). In comparison, as the user 116 approaches the imaging sensor 120(1) and their face is visible, facial recognition may be used. Once identified, such as by way of facial recognition, one or more of gait recognition or clothing recognition may be used to track the user 116 within the facility 102.

Other techniques such as artificial neural networks (ANN), active appearance models (AAM), active shape models (ASM), cascade classifiers, support vector machines, Haar detectors, local binary pattern (LBP) classifiers, and so forth, may also be used to process sensor data 126. For example, the ANN may be trained using a supervised learning algorithm such that object identifiers are associated with images of particular objects within training images provided to the ANN. Once trained, the ANN may be provided with the images and may provide, as output, the object identifier.

The data visualization module 330 may use information in the data store 320 to generate data for display 132. For example, the data visualization module 330 may access the physical layout data 124 and the sensor data 126. As described above, the physical layout data 124 comprises information about physical configuration of the facility 102 or portions thereof. The sensor data 126 comprises information acquired from one or more of the sensors 120. For example, the sensor data 126 may include, but is not limited to, image data 332 acquired from one or more of the imaging sensors 120(1), touchpoint data 334 acquired from one or more of the touchpoint sensors 120(14), weight data 336 acquired from one or more of the weight sensors 120(6), and so forth.

In some implementations, the touchpoint data 334 may be generated by one or more of the sensors 120. For example, the imaging sensors 120(1), 3D sensors 120(2), proximity sensors 120(13), touchpoint sensors 120(14), and so forth, may be used to generate touchpoint data 334. Continuing the example, images acquired by the imaging sensors 120(1) may be processed to determine the presence of a hand of the user 116 touching a particular object, such as an item 104, inventory location 114, and so forth. The touchpoint data 334 may indicate a coordinate in one dimension, a pair of coordinates in two dimensions, a point or volume in three-dimensions, and so forth.

During operation, the data processing module 328 may access one or more data processing parameters 338 that may be stored in the data store 320. The data processing parameters 338 may be used to control operation of one or more portions of the data processing module 328. For example, the data processing parameters 338 may specify parameters of an algorithm used to perform object recognition on image data 332. In another example, the data processing parameters 338 may comprise thresholds or other settings, such as affecting how the user 116 or other object is tracked within the facility 102. Continuing the example, the data processing parameters 338 may specify that the location of the user 116 in the facility 102 is to be determined at particular intervals, such as every 10 seconds. By changing one or more of the data processing parameters 338, operation of the data processing module 328 and corresponding functions of the inventory management module 324 may be modified.

The data processing module 328 processes at least a portion of sensor data 126 to produce processed data 340. For example, the processed data 340 may comprise information indicative of a location of the user 116 within the facility 102, a user identity associated with a particular user 116, touchpoints based on touchpoint data 334, user touch association data indicative of a touch between a particular user 116 and a particular item 104, and so forth. The processed data 340 may be stored in the data store 320.

The data visualization module 330 may access one or more visualization parameters 342 that may be stored in the data store 320. The visualization parameters 342 may comprise settings or other data used during the generation of the data for display 132. For example, the visualization parameters 342 may specify views to be presented, informational overlays to be included in those views, and so forth. In some implementations, the visualization parameters 342 may be specific to a particular analyst 216 or a group of analysts 216 such as "developers".

The data for display 132 may comprise information or instructions that, when presented, rendered, or otherwise processed, provide a visual representation of data based at least in part on the sensor data 126. The data for display 132 may comprise one or more files. The one or more files may include image files, executable files, scripts, JavaScript object notation (JSON) data, Extensible Markup Language (XML) data, vector graphic instructions, and so forth. For example, the data for display 132 may comprise a bitmap image file, HTML "<canvas>" elements, and so forth.

In some implementations, the data for display 132 may be configured to be rendered or presented using a web browser engine. For example, the communication module 322 may comprise a web server that provides the data for display 132 as an HTML file to the computing device 214.

The data for display 132 may also include information from the data processing module 328, such as one or more hypotheses for assessment. For example, the data processing module 328 may use one or more automated or manual techniques to determine the identity of the user 116, determine which user 116 picked or placed an item 104, and so forth. These determinations may be presented as hypotheses for assessment by the analyst 216. For example, the hypothesis made by the data processing module 328 may be that the user 116(5) picked the item 104(3) from the inventory location 114(13). If this hypothesis is determined to have a confidence level below a threshold, it may be presented to the analyst 216 in conjunction with the data for display 132.

The analyst 216 may assess the information presented in the data for display 132 and provide input data 344 in response. For example, the analyst 216 may use the data for display 132 as presented on the computing device 214 and provide input data 344 indicating that the item 104(3) was actually picked by the user 116(2). The input data 344 may be stored in the data store 320.

In some implementations, the input data 344 may be used to change data processing parameters 338, train a machine learning system, and so forth. Continuing the example above, the image data 344 indicating that the item 104(3) is actually picked by the user 116(2) may be provided to the machine learning system. Subsequently, the machine learning system may, over time, exhibit improved accuracy in generating hypotheses.

Other modules 346 may also be present in the memory 316, as well as other data 348 in the data store 320. For example, the other modules 346 may include an accounting module. The accounting module may be configured to use the processed data 340 to determine an account to bill for items 104 picked by a particular user 116. The other data 348 may comprise information such as billing account data, camera configuration data, and so forth.

The one or more processors 304 may be in communication with one or more of the other components of the server 204. For example, the processor 304 may couple to a data bus that is operated by a bus controller. The bus may transfer data between the processor 304 and another device such as other processors 304, the communication interfaces 308, the I/O devices 314, the memory 316, and so forth.

Figure 4:
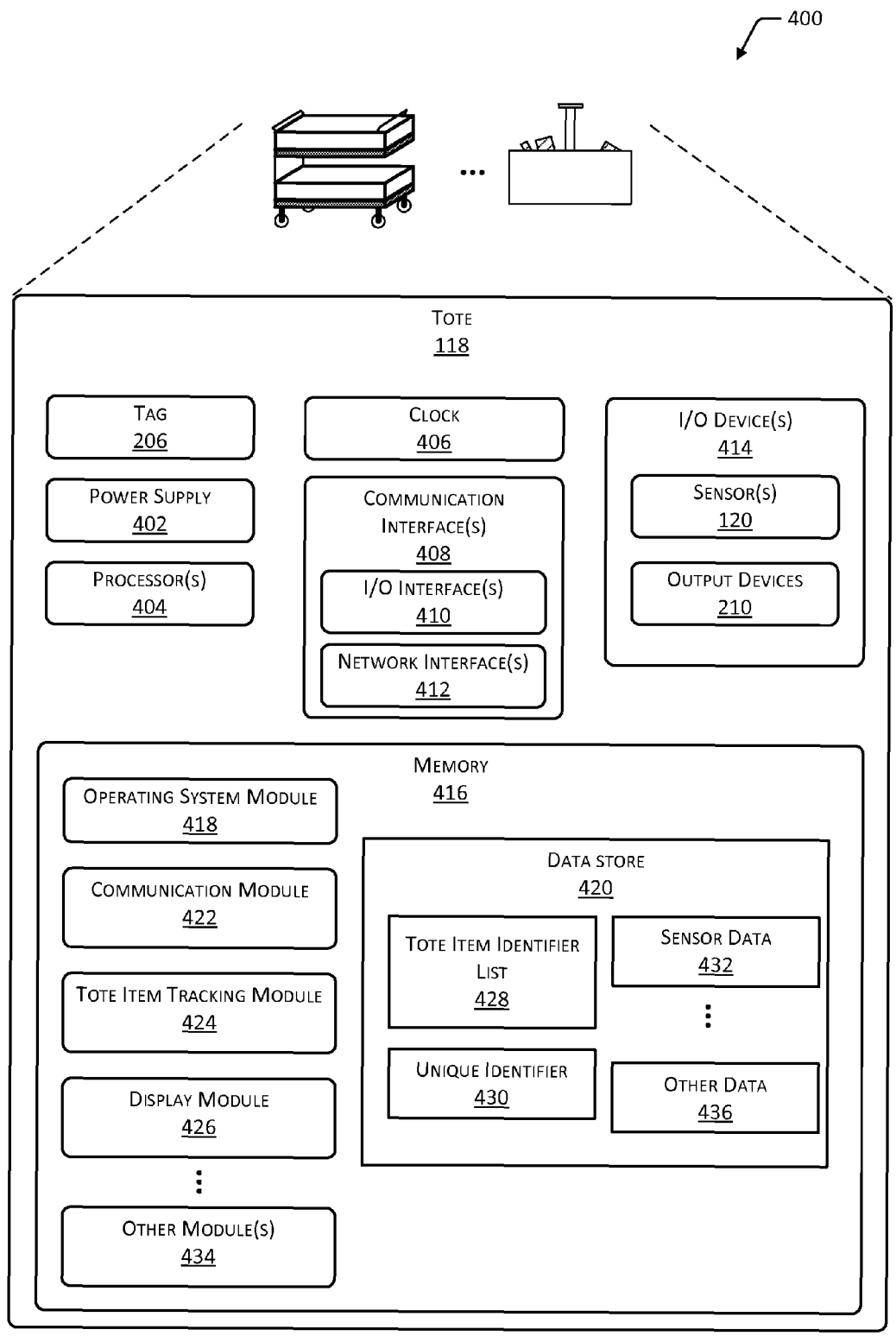
FIG. 4 illustrates a block diagram of a tote that may be used in the facility, according to some implementations.

FIG. 4 illustrates a block diagram 400 of the tote 118, according to some implementations. The tote 118 may include a tag 206. The tag 206 may be affixed to, integral with, or otherwise associated with the tote 118. In some implementations, the tote 118 may have identifiers or other indicia thereupon. For example, a machine-readable optical code, such as a barcode, may be affixed to a side of the tote 118.

The tote 118 may also include a power supply 402. The power supply 402 may be configured to provide electrical power suitable for operating the components in the tote 118.

The power supply 402 may comprise one or more of photovoltaic cells, batteries, wireless power receivers, fuel cells, flywheels, capacitors, and so forth.

The tote 118 may include one or more hardware processors 404 (processors) configured to execute one or more stored instructions. The processors 404 may comprise one or more cores of different types. For example, the processors 404 may include application processor units, graphic processing units, and so forth.

One or more clocks 406 may provide information indicative of date, time, ticks, and so forth. For example, the processor 404 may use data from the clock 406 to generate timestamps, trigger a preprogrammed action, and so forth.

The tote 118 may include one or more communication interfaces 408, such as I/O interfaces 410, network interfaces 412, and so forth. The communication interfaces 408 may enable the tote 118, or components thereof, to communicate with other devices or components. The communication interfaces 408 may include one or more I/O interfaces 410. The I/O interfaces 410 may comprise I2C, SPI, USB, RS-232, and so forth.

The I/O interface(s) 410 may couple to one or more I/O devices 414. The I/O devices 414 may include one or more of input devices such as the sensors 120. As described above, the sensors 120 may include imaging sensors 120(1), weight sensors 120(6), RFID readers 120(8), and so forth. The I/O devices 414 may also include output devices 210 such as haptic output devices 210(1), audio output devices 210(2), display output devices 210(3), and so forth. For example, the tote 118 may include other output devices 210(T) such as lights that may be activated to provide information to the user 116. In some implementations, I/O devices 414 may be combined. For example, a touchscreen display may incorporate a touch sensor 120(4) and a display output device 210(3). In some embodiments, the I/O devices 414 may be physically incorporated with the tote 118 or may be externally placed.

The network interfaces 412 are configured to provide communications between the tote 118 and other devices, routers, servers 204, access points 212, and so forth. The network interfaces 412 may include devices configured to couple to PANs, LANs, WANs, and so forth. For example, the network interfaces 412 may include devices compatible with Ethernet, Wi-Fi®, Bluetooth®, ZigBee®, and so forth.

The tote 118 may also include one or more busses or other internal communications hardware or software that allow for the transfer of data between the various modules and components of the tote 118.

As shown in FIG. 4, the tote 118 includes one or more memories 416. The memory 416 may comprise one or more non-transitory CRSM as described above in FIG. 3. The memory 416 provides storage of computer-readable instructions, data structures, program modules, and other data for the operation of the tote 118. A few example functional modules are shown stored in the memory 416, although the same functionality may alternatively be implemented in hardware, firmware, or as a SoC.

The memory 416 may include at least one OS module 418. The OS module 418 is configured to manage hardware resource devices such as the communication interfaces 408, the I/O devices 414, and so forth, and provide various services to applications or modules executing on the processors 404. The OS module 418 may implement a variant of the FreeBSD® operating system as promulgated by the FreeBSD Project; other UNIX™ or UNIX-like variants; a variation of the Linux™ operating system as promulgated by Linus Torvalds; the Windows® operating system from Microsoft Corporation of Redmond, Wash., USA; and so forth.

A data store 420 and one or more of the following modules may also be stored in the memory 416. These modules may be executed as foreground applications, background tasks, daemons, and so forth. The data store 420 may use a flat file, database, linked list, tree, executable code, script, or other data structure to store information. In some implementations, the data store 420 or a portion of the data store 420 may be distributed across one or more other devices including other totes 118, network attached storage devices, and so forth.

A communication module 422 may be configured to establish communications with one or more of other totes 118, servers 204, or other devices. The communications may be authenticated, encrypted, and so forth.

The memory 416 may also store a tote item tracking module 424. The tote item tracking module 424 may be configured to maintain a list of items 104, which are associated with the tote 118. For example, the tote item tracking module 424 may receive input from a user 116 by way of a touch screen display with which the user 116 may enter information indicative of the item 104 placed in the tote 118. In another example, the tote item tracking module 424 may receive input from the I/O devices 414, such as the weight sensor 120(6) or an RFID reader 120(8). The tote item tracking module 424 may send the list of items 104 to the inventory management system 122. The tote item tracking module 424 may also be configured to receive information from the inventory management system 122. For example, a list of items 104 to be picked may be presented within a user interface on the display output device 210(3) of the tote 118.

The memory 416 may include a display module 426. The display module 426 may be configured to present information, such as information received from the one or more servers 204 or generated onboard the tote 118, using one or more of the output devices 210. For example, the display module 426 may be configured to present the data for display 132 using the display output device(s) 210(3).

The data store 420 may store a tote item identifier list 428. The tote item identifier list 428 may comprise data indicating one or more items 104 associated with the tote 118. For example, the tote item identifier list 428 may indicate the items 104 that are present in the tote 118. The tote item tracking module 424 may generate or otherwise maintain a tote item identifier list 428.

A unique identifier 430 may also be stored in the memory 416. In some implementations, the unique identifier 430 may be stored in rewritable memory, write-once-read-only memory, and so forth. For example, the unique identifier 430 may be burned into a one-time programmable non-volatile memory, such as a programmable read-only memory (PROM). In some implementations, the unique identifier 430 may be part of a communication interface 408. For example, the unique identifier 430 may comprise a media access control (MAC) address associated with a Bluetooth® interface.

The data store 420 may also store sensor data 432. The sensor data 432 may be acquired from the sensors 120 onboard the tote 118. The sensor data 432 may be provided to the inventory management system 122. Other modules 434 may also be stored within the memory 416. For example, a user authentication module may be configured to receive input and authenticate or identify a particular user 116. Other data 436 may also be stored within the data store 420. For example, the other data 436 may include tote configuration settings, user interface preferences, and so forth.

Figure 5:
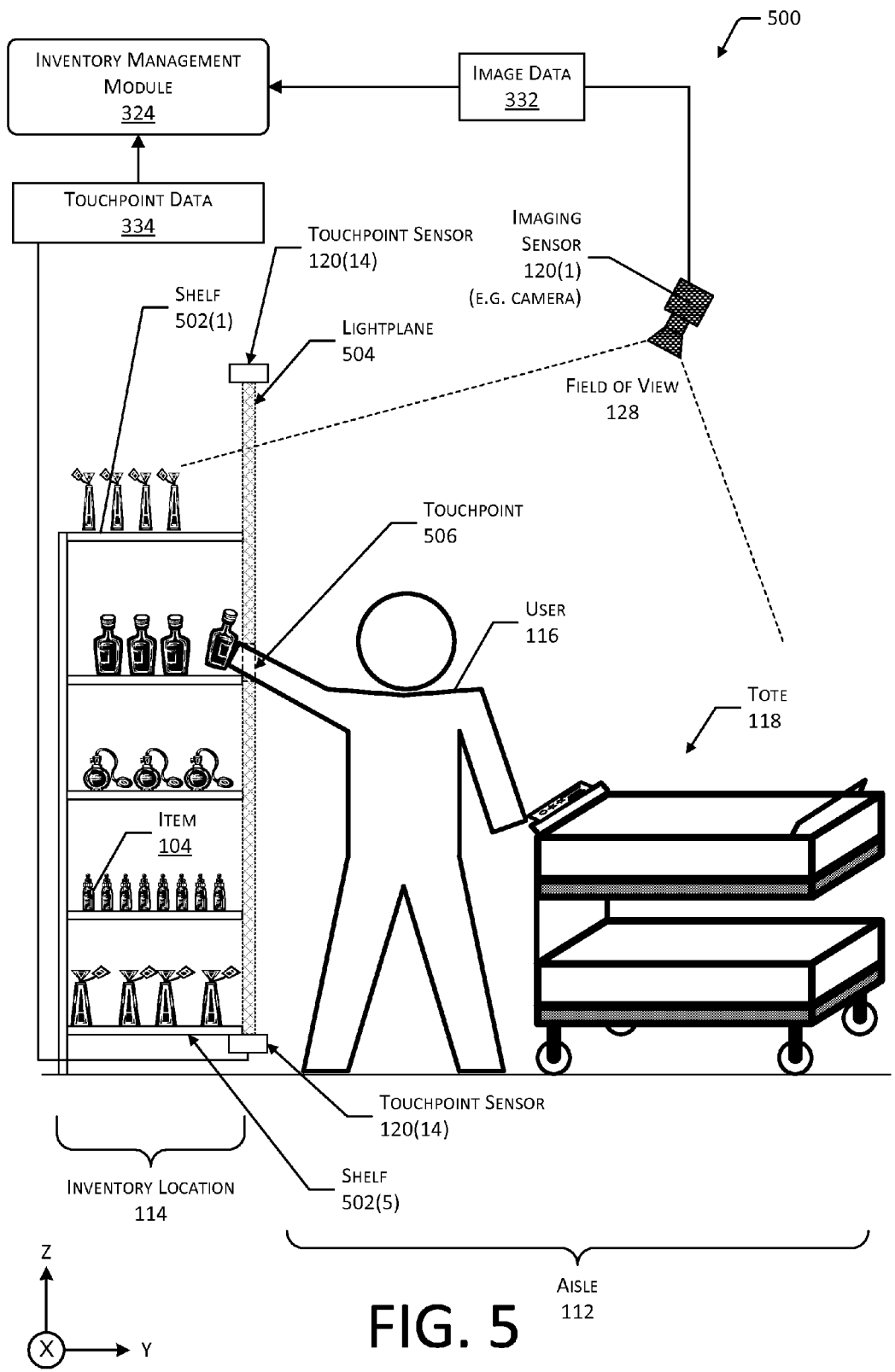
FIG. 5 illustrates a side view of a portion of the facility and sensors gathering sensor data, according to some implementations.

FIG. 5 illustrates a side view 500 of a portion of the facility 102. This illustration depicts inventory locations 114 comprising shelves 502(1)-502(5) mounted to a rack. Each shelf 502 may have a shelf outer edge. For example, the shelf outer edge may be a portion of the shelf 502 that is proximate to the aisle 112.

One or more touchpoint sensors 120(14) may be arranged to provide a lightplane 504 between the shelf outer edge and where a user 116 may normally be expected within the aisle 112. For example, the light emitters of a touchpoint sensor 120(14) may be located above the outer edge of the top shelf 502(1) and may emit infrared light downwards, while the corresponding light detectors located below the lowermost shelf 502(5) detect, when unobstructed, the emitted infrared light.

The touchpoint sensor 120(14) provides touchpoint data 334 responsive to a touch or presence of the user 116 (or another object). The touchpoint data 334 is indicative of a position of a touchpoint 506. The touchpoint 506 may comprise a point in space at which a portion of the user 116 or another object intersects the light plane 504. The touch as indicated by the touchpoint 506 may thus be indicative of an actual point in three-dimensional space that is between the item 104 or the inventory location 114 and the user 116. For example, the touchpoint data 334 may indicate a coordinate in one dimension, a pair of coordinates in two dimensions, and so forth.

The sensors 120 may be deployed throughout the facility 102. For example, the imaging sensors 120(1) may be deployed overhead to acquire image data 332 such as images of the inventory locations 114, the users 116, and so forth, during operation of the facility 102. In another example, one or more weight sensors 120(6) may provide weight data 336 about an inventory location 114 or portion thereof, and so forth.

The sensor data 126 may then be used by the inventory management module 324 to facilitate operation of the facility 102. For example, the image of the user 116 removing an item 104 from the shelf 504(2) inventory location 114 may be used to determine a pick and change item quantity information, assign a charge for the item 104 to a particular user 116, and so forth.

Figure 6:
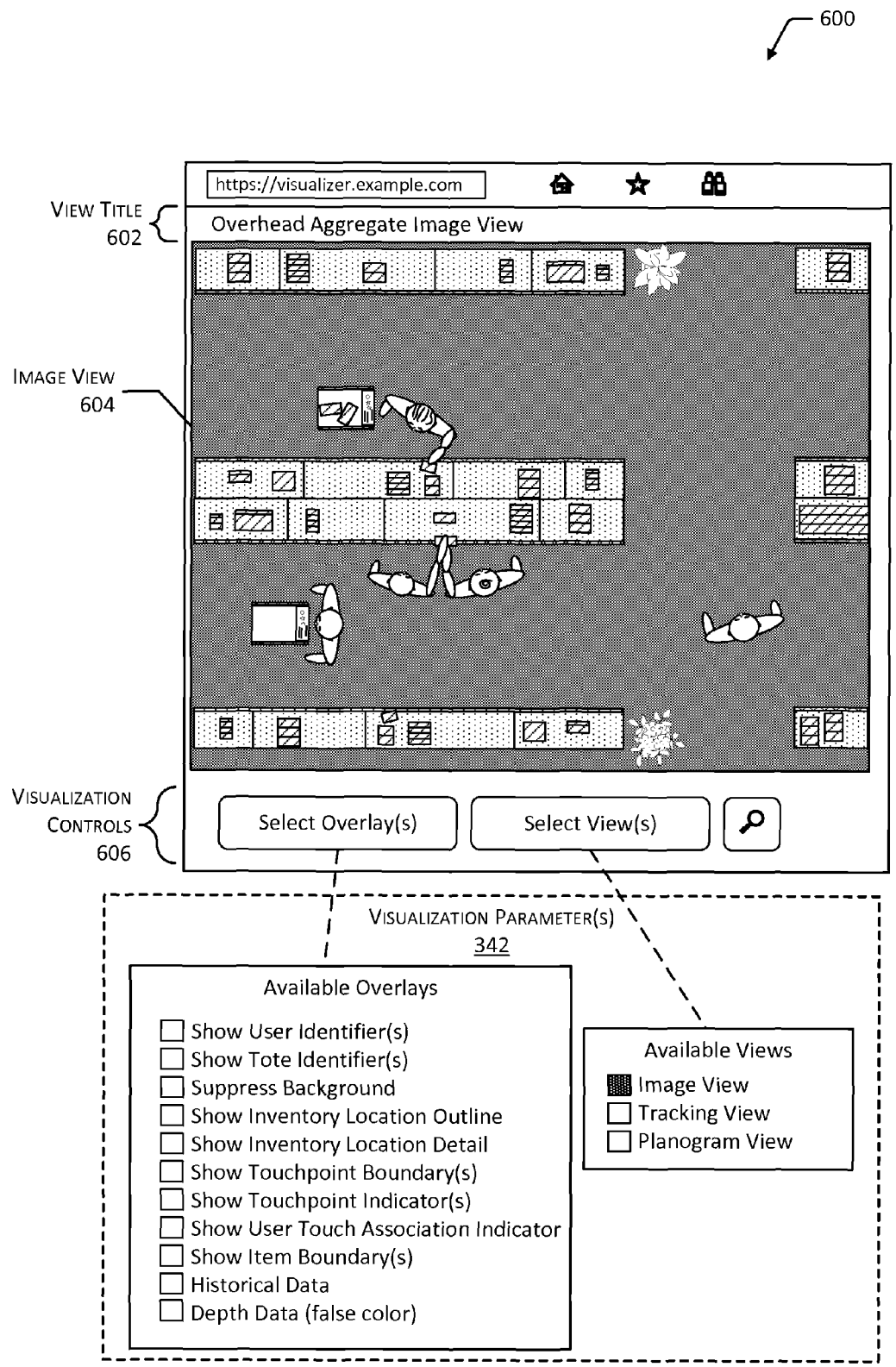
FIG. 6 illustrates a user interface presenting an overhead aggregate image view, according to some implementations.

FIG. 6 illustrates a user interface 600 comprising an image view, according to some implementations. The computing device 214 may use the data for display 132 to present the user interface 600 to the analyst 216. While the user interface 600 is depicted as being presented within a web browser, in other implementations, the user interface 600 may be provided by dedicated application, as a plug-in or enhancement of another tool, and so forth.

The user interface 600 may comprise a view title 602, an image view 604, and one or more visualization controls 606. The view title 602 may comprise icons, alphanumeric text, or other indicia that may be used by the analyst 216 to designate the information being presented. For example, the view title 602 in this illustration is "Overhead Aggregate Image View".

The image view 604 comprises an image acquired by an imaging sensor 120(1). The imaging sensor 120(1) may be configured to detect one or more of infrared, visible, or ultraviolet light wavelengths. For example, the image data 332 may be a visible light "red-green-blue" color image.

The image presented in the image view 604 may comprise a single image or an aggregate image. The single image may comprise a single image frame acquired by a single imaging sensor 120(1). The aggregate image may comprise a plurality of images that have been joined together, merged into a single image, or otherwise arranged relative to one another. For example, the aggregate image may be created by processing image data 332 from adjacent imaging sensors 120(1) using the OpenCV class "Stitcher" to detect portions of the image that correspond to one another. In other implementations, the physical layout data 124 comprising information indicative of location within the facility 102 of the individual imaging sensors 120(1) may be used to provide for the relative arrangement of the image data 332. For example, the physical layout data 124 may indicate that imaging sensor 120(1)(11) is to the left of imaging sensor 120(1)(12), and the aggregate image may be so configured.

The plurality of images may be acquired by different imaging sensors 120(1), having different fields of view 128. In some implementations, the plurality of images may be obtained contemporaneously with one another, such as within a time interval of several seconds of one another. The plurality of images may be stitched or otherwise assembled to provide a larger image of the facility 102, such as if a single imaging sensor 120(1) located high overhead was looking down with a field of view 128 encompassing the facility 102. When image data 332 is unavailable from a particular imaging sensor 120(1), in place of that unavailable image data 332, the aggregate image may present alternative data, such as the most recently available image, all black pixels, a crosshatch pattern, and so forth. For example, a portion of the aisle 112 that is in the field of view 128 of an inoperable imaging sensor 120(1) may be represented by a solid black area in the image view 604.

In some implementations, one or more of the data processing module 328, the data visualization module 330, and so forth, may perform other image processing operations on the image data 332. For example, a geometric image transform function may be applied to image data 332 to correct for variations in placement between imaging sensors 120(1), orientation of field of view 128, and so forth. Continuing the example, the OpenCV function "warpPerspective" may be used to perform the geometric image transform function. In another example, a transform may be used to map particular pixel locations in image data 332 to particular points in space within the facility 102. For example, the transform may be used to determine a location in space (of at least two dimensions) with where something appears in the image. The apparent position of an object, such as the user 116 or their hand, may then be transformed into coordinates indicative of a location of the object within the facility 102, or other indicia of location. The image data 332 may include information obtained by the 3D sensors 120(2). The transform may be indicative of a correspondence of between a location in the facility 102 and coordinates in the three-dimensional data. For example, the transform may be used to adjust for the position of the 3D sensor 120(1) and corresponding field of view 128, with output that is expressed in terms of coordinates with respect to a mapping origin in the facility 102, rather than with respect to the 3D sensor 120(2).

The data processing module 328 may also determine a touch by the user 116 based on image data 332. In one implementation, the touch may be based on a merger or contact of two or more contours of different objects. A first contour associated with the user 116 may be determined, such as of the fingers of the user 116 in the image data 332. A second contour associated with an object such as the item 104 may then be determined. For example, the second contour may comprise an outline of the item 104. Contact, overlap, merger, and so forth, of the first contour and the second contour may be determined and the determination used to indicate occurrence of a touch. In other implementations, other techniques may be used to indicate a touch. For example, presence of a portion of the user 116, such as a hand or finger, appearing at a particular region within a frame of the image data 332 may be deemed to be a touch. Continuing the example, an image of the user's 116 hand reaching past a front edge of the shelf 502 may be deemed to be a touch, even if no contact is made with items 104 stowed or held on the shelf. For example, it may be useful to determine when the user is close to touching an item 104 but does not make contact, such as when reaching for something that is just out of reach.

The image view 604 provides the visualization of at least a portion of the facility 102. The visualization controls 606 allow the analyst 216 to set or change one or more of the visualization parameters 342. By setting or changing the visualization parameters 342, the visualization may be modified, views may be added or removed, overlays added or removed, and so forth. For example, the visualization controls 606 may include a "Select Overlay" control and a "Select View" control. The select overlay control allows the analyst 216 to change the visualization parameters 342 to add or remove information to the image view 604.

With respect to an underlying view such as the image view 604, tracking view, planogram view, and so forth, information may be presented as an overlay. The overlay comprises additional information presented by one or more graphical layers that appears to be atop or above the image view 604. For example, an overlay may comprise one or more HTML elements presented with a "z-index" value resulting in presentation at a stack level that is different from the underlying view. Different layers may present different information. In some implementations, the overlay may be a layer that is below, and layers above may be configured to be transparent.

In other implementations, other graphical techniques may be used to present information in the image view 604. For example, instead of an overlay, the information may be embedded into the bitmap included in the data for display 132 that is then presented as the image view 604.

An overlay may be used to present user identifiers associated with at least some of the users 116 in the image view 604. For example, the user identifier may comprise a rectangle containing a name or identification number used to distinguish a particular user 116. Examples of the user identifiers are depicted below with regard to FIG. 7.

An overlay may be used to present tote identifiers associated with at least some of the totes 118 in the image view 604. For example, the tote identifier may comprise a rectangle containing a human-friendly term such as "Tote 118 (2)" that is associated with the unique identifier 430 stored in the data store 420 of the tote 118. Examples of the tote identifiers are depicted below with regard to FIG. 7.

An overlay may be used to suppress or remove a background appearing within the image view 604. In one implementation, the background may be determined based on images acquired while the facility 102 or portion thereof is within a particular state. For example, a background aggregate image may be generated of the facility 102 at night when the facility 102 is unoccupied. A view of a foreground, that is the pixels that are not in the background, may be produced by subtracting the background aggregate image from an aggregate image based on images obtained at another time, such as during operation of the facility 102 when people are present. As a result of the subtraction, those remaining pixels that are different are of "foreground" objects. Continuing the example, after subtraction, flooring, fixed furniture, and so forth, are no longer visible, while the user 116, the tote 118, or a moved piece of furniture, may be visible.

In another implementation, the background may be determined and suppressed by processing image data 332 acquired at different times to determine pixels in the foreground that change and those in the background that have changed less than a threshold value. For example, the Gaussian mixture-based background/foreground segmentation algorithm as implemented by OpenCV in the "BackgroundSubtractorMOG" function may be used. Further examples of the background suppression are depicted below with regard to FIG. 7.

An overlay may be used to show an inventory location outline. The inventory location outline provides information indicative of a layout of at least a portion of one or more inventory locations 114 in the facility 102. The layout may comprise a "footprint" or contour of an inventory location 114. The inventory location outline data may be obtained from the physical layout data 124, such as a layout plan of the facility 102. In other implementations, the inventory location outline may be determined by using one or more image processing techniques to determine where the edges of the inventory locations 114 are based on the image data 332 acquired in the facility 102. For example, the background images, such as determined above, may be processed to identify the inventory locations 114 appearing therein. Examples of the inventory location outlines are depicted below with regard to FIG. 7.

An overlay may be used to show inventory location detail. The inventory location detail provides information such as inventory location identifiers, subdivisions within an inventory location 114, and so forth. For example, the inventory location identifiers may designate a particular inventory location 114. A subdivision within an inventory location 114 may be indicative of where a particular item 104 is to be placed. For example, subdivision may specify that the left one third of the shelf 502(2) is inventory location 114(12) designated to store items 104(7). Examples of the inventory location detail are depicted below with regard to FIG. 8.

An overlay may be used to show a touch boundary. The touch boundary is indicative of an area or zone of detection provided by a mechanism to detect touches or other presence of objects therein. The touch boundary may be presented with respect to an inventory location 114. For example, the touch boundary may indicate the apparent position of the lightplane 504 between the inventory location 114 and an aisle 112. Examples of touch boundaries are depicted below with regard to FIG. 8.

An overlay may also be used to show touchpoint indicators. The touchpoint indicators provide a visual indicia of where a touchpoint 506 occurred. The touchpoint data 334 may be used to generate the touchpoint indicators. Examples of touchpoint indicators are depicted below with regard to FIG. 10.

An overlay may be used to show user touch association indicators. The user touch association indicators provide a visual indicia associating a particular touchpoint 506 with a particular user 116. For example, the user touch association indicator may comprise a line extending from the head of the user 116 to a point corresponding to the location of the touchpoint 506. Examples of user touch association indicators are depicted below with regard to FIG. 8.

An overlay may be used to show item boundaries. An item boundary may comprise a visual indication of the size and shape of an item 104 as it would appear in the view. For example, an item boundary may depict a silhouette of the item 104 as resting on the shelf 502. Examples of the item boundaries are depicted below with regard to FIG. 10.

An overlay may be used to present historical data. For example, the historical data may comprise sensor data 126 or processed data 340 associated with an earlier point in time. For example, the historical data may be used to show previous locations of the user 116 during a particular interval of time, all touches by all users 116 for a particular inventory location 114 during a particular interval of time, and so forth. In some implementations the historical data may be color coded. For example, more recently acquired data may be depicted with a first color or darker shade of one color while older data has a second color or lighter shade of the one color. The historical data of user tracking information may then appear to be a colored "tail", sequence, or other depiction.

An overlay may be used to present depth data. The depth data may comprise information such as acquired by the 3D sensors 120(2), stereoscopic imaging sensors 120(1), data from the physical layout data 124, and so forth. In some implementations, the depth data may comprise an altitude or height above ground of at least a portion of an object, while in other implementations, the depth data may comprise a distance from the sensor 120 to the at least a portion of an object. The depth data may be presented as a false color overlay. For example, objects that are close to the sensor 120 appear red, while objects that are farther from the sensor 120 may appear green.

The visualization parameters 342 may also specify different views that are available. A view may be deemed available when data to generate that view is accessible. For example, the image view 604 may be available when image data 332 is accessible by the data visualization module 330.

By way of illustration and not necessarily as a limitation some of the views in this disclosure, such as the image view 604, are depicted as overhead views. In other implementations, the views may be presented from another apparent point of view. For example, the image view 604 may comprise a view of one side of the aisle 112, such as from a point of view of the imaging sensors 120(1) on the opposite side of the aisle 112.

The visualization controls 606 may also allow other types of manipulation of the image view 604. For example, the visualization controls 606 may provide functionality to change presentation of the image by zooming, panning, rotating, changing contrast, changing brightness, changing color balance, and so forth.

The analyst 216 may use the image view 604 to observe how users 116 move within the facility 102, determine undesirable conditions such as an obstruction in an aisle 112, and so forth. The analyst 216 may generate different data for display 132 by using the visualization controls 606 to change one or more of the visualization parameters 342. For example, the analyst 216 may select one or more of the overlays, combine one or more of the available views, and so forth. By using the data for display 132, the analyst 216 may perform various functions, such as testing hypotheses, evaluating operation of sensors 120, testing new functions, checking the facility 102 for unsafe conditions, and so forth.

Figure 7:
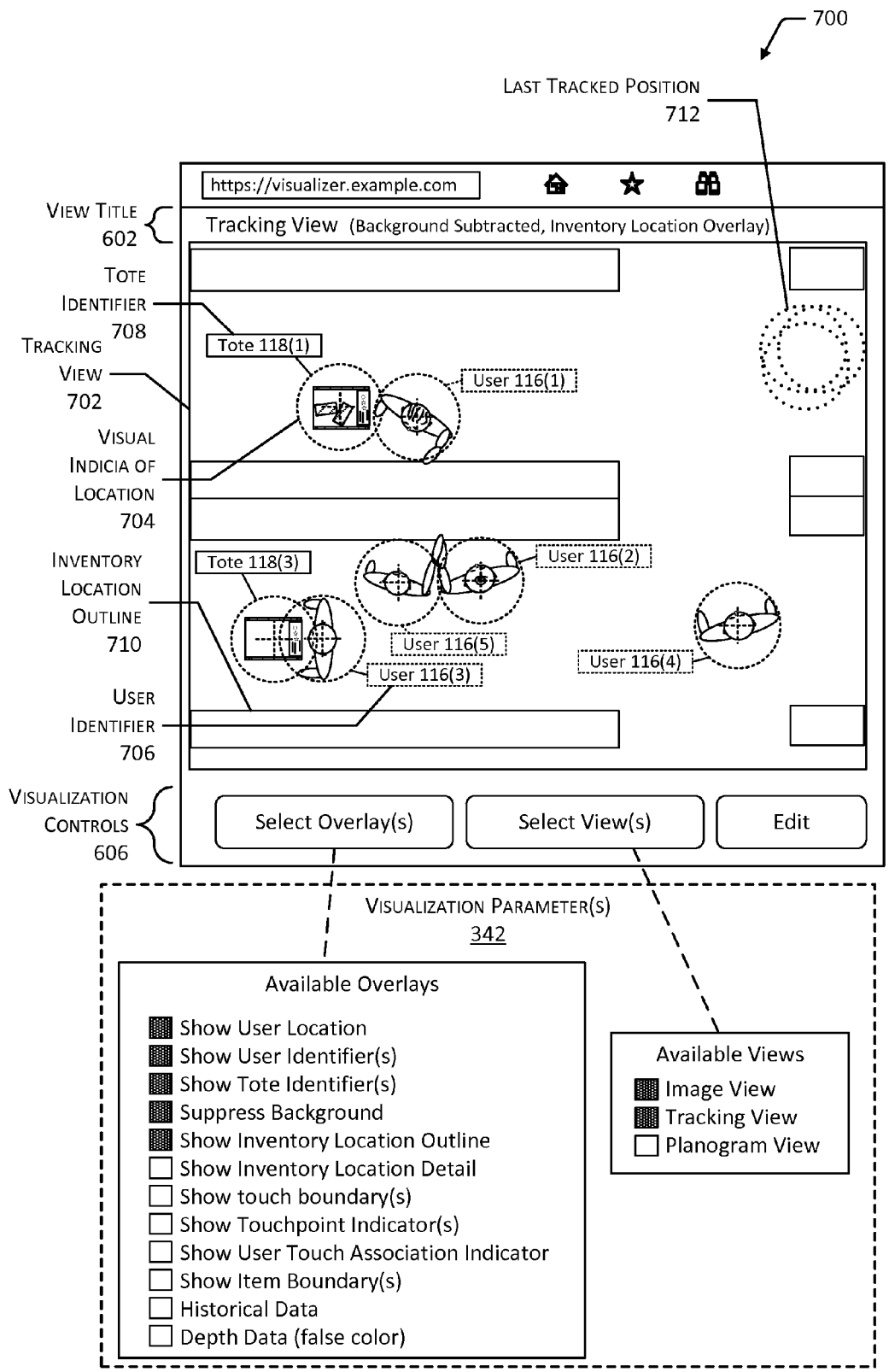
FIG. 7 illustrates a user interface presenting a tracking view, according to some implementations.

FIG. 7 illustrates a user interface 700 comprising a tracking view, according to some implementations. The computing device 214 may use the data for display 132 to present the user interface 700 to the analyst 216. While the user interface 700 is depicted as being presented within a web browser, in other implementations, the user interface 700 may be provided by dedicated application, as a plug-in or enhancement of another tool, and so forth.

The user interface 700 may include a view title 602 and one or more visualization controls 606, such as described above. For example, the view title 602 of the user interface 700 is "Tracking View (Background Subtracted, Inventory Location Overlay)". A tracking view 702 is depicted in the user interface 700. The tracking view 702 comprises information indicative of the location of one or more users 116 within the facility 102. In some implementations, the tracking view 702 may be more of a schematic representation of the facility 102 or portion thereof, as compared to an actual image as presented in the image view 604.

With the tracking view 702, the objects which the inventory management module 324 is tracking within the facility 102 are designated with visual indicia of location 704. For example, the visual indicia of location 704 may comprise a crosshair placed in the center of an object (such as the head of the user 116, portion of the tote 118, and so forth) surrounded by a circle. In addition to the visual indicia of location 704, the tracking view 702 may include a graphical representation of at least a portion of the user 116. The graphical representation may include an outline, icon, at least in part of an image, and so forth. For example, the image data 332 obtained by the imaging sensor 120(1) or the 3D sensor 120(2) may be processed to extract or "crop" out a picture of the user 116 for use as the graphical representation. The image data 332 may be obtained from sensors 120 at various locations around the facility 102, such as overhead, in the inventory locations 114, and so forth.

Elements presented by an overlay may be color coded. Such color coding may enhance recognition of objects presented in the user interface, improve determination of a discontinuity in the underlying data, and so forth. For example, the visual indicia of location 704 associated with the user identifier "user 116(1)" may be presented as the color green while that for the user identifier "user 116(2)" may be orange, and an unknown user identifier is purple. While viewing historical data of the visual indicia of location 704 for the user 116(1), the analyst 216 may see a trail of the last 5 minutes of tracking data for that user persisted in the user interface. The trail may appear as primarily green, with a portion that is purple. As a result, the analyst 216 may quickly determine that something caused the identity of the user 116(1) to become uncertain, and see depicted in the user interface the location in the facility 102 where the uncertainty occurred.

In the user interface 700 depicted, the tracking view 702 also includes at least a portion of the image view 604 described above. The background suppression overlay has been applied to the image view 604, removing the background but leaving presentation of the users 116 and their totes 118. The images of the one or more users 116 may assist the analyst 216 in analyzing the actions of the users 116.

The designation of portions of an image as "background" and their subsequent removal may be accomplished using a variety of techniques. For example, a plurality of images acquired by an imaging sensor 120(1), 3D sensor 120(2), and so forth, may be accessed. In one implementation, at least a subset of the images may be compared with one another to determine unchanging portions that may be designated as a background. In another implementation, at least a subset of the images may be compared to a reference image to determine unchanging portions. For example, those pixels that exhibit changes in value less than a threshold value may be deemed to be unchanging. The pixels of the unchanging portions may then be designated as "background".

The visual indicia of location 704 as compared to the image of the object as presented in the image view 604 may provide the analyst 216 with information such as the accuracy of object tracking. For example, the visual indicia of location 704 may be misaligned and centered on a user's hand instead of their head, resulting in incorrect location data about the user 116. The analyst 216 may use the visualization controls 606, such as an edit control, to correct this misalignment.

The user identifier overlay and the tote identifier overlay are in use in the tracking view 702. A user identifier 706 provides information about the user 116. For example, the user identifier 706 depicted comprises a rectangle containing the user name associated with the user 116 by the inventory management module 324. The user identifier 706 is presented in the tracking view 702 proximate to the visual indicia of location 704 associated with the same user 116. Similarly, the tote identifier 708 provides information about the tote 118. In other implementations, additional data about the object may be presented. For example, the tracking view 702 may present a flag or icon indicating a particular user 116 is a visitor, employee, and so forth.

The show inventory location outline overlay is also in use in the tracking view 702 depicted here. An inventory location outline 710 is presented in the tracking view 702 indicating at least an overall or "large scale" footprint or outline of one or more of the inventory locations 114 of the facility 102. For example, the inventory location outline 710 may indicate the overall contour of a row of racks, as compared to the shape of each individual rack.

A last tracked position 712 may be depicted in the tracking view 702. Tracking of an object within the facility 102 may be incomplete. For example, one or more sensors 120 in a particular portion of the facility 102 may be inactive, incorrect data may be produced by the one or more sensors 120, one or more the characteristics of the object that are being used for tracking may have changed, and so forth. As a result, tracking of an object may be lost or regained in certain circumstances. The location within the facility 102 at which tracking was lost or dropped below a threshold confidence level may be indicated using the last tracked position 712. The analyst 216 may use the last tracked position 712 indicia to determine that a sensor 120 is inoperable, that additional sensors 120 are called for at a certain location within the facility 102, and so forth.

In some implementations, an overlay of the historical data (not shown) may also be presented in the tracking view 702. For example, the historical data may comprise the path of the user 116 through the facility 102.

Figure 8:
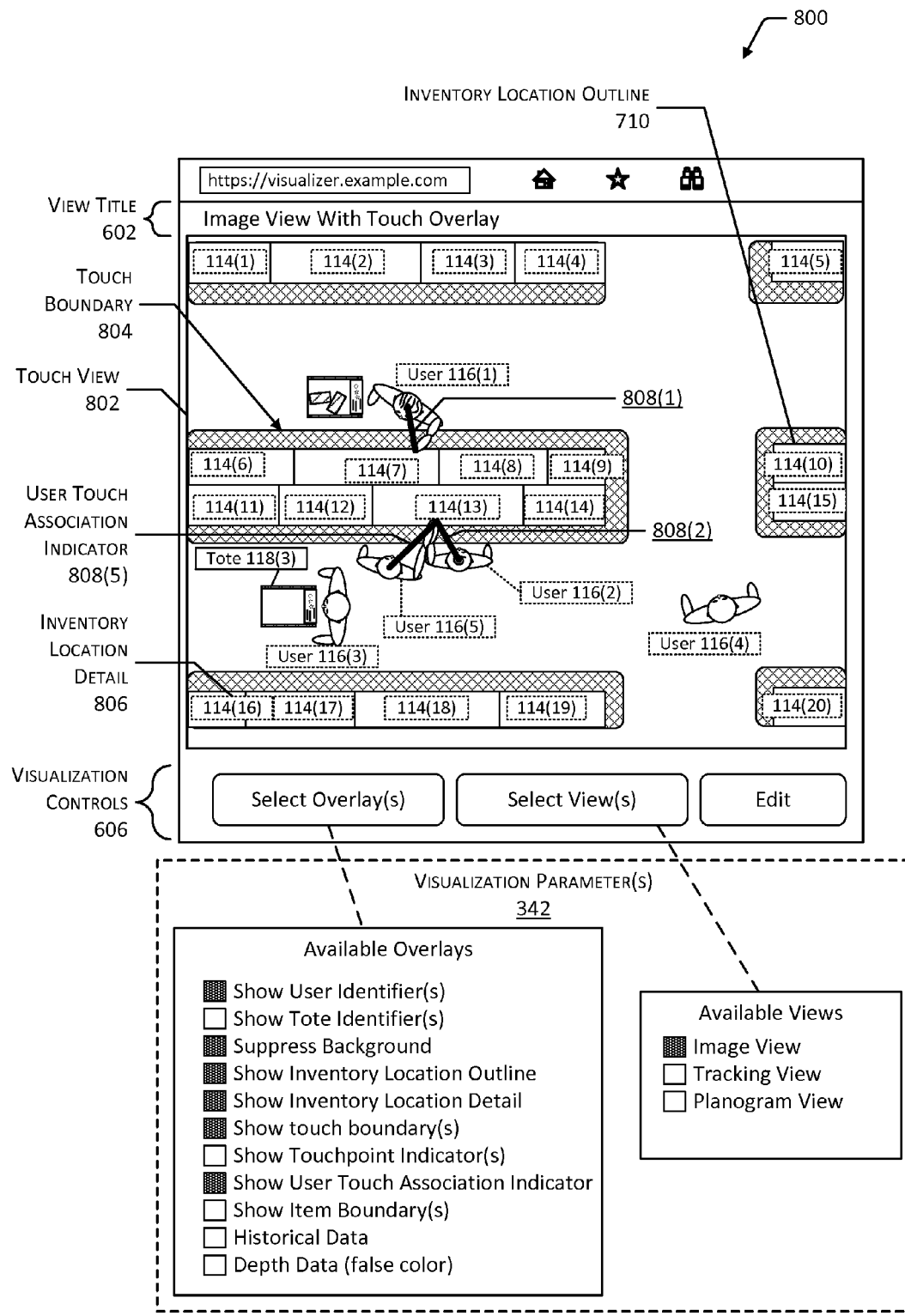
FIG. 8 illustrates a user interface presenting an image view with a touch overlay providing information about user interaction with items, according to some implementations.

FIG. 8 illustrates a user interface 800 presenting an image view 604 with a touch overlay providing information about user interaction with items 104, according to some implementations.

The user interface 800 may include a view title 602 and one or more visualization controls 606, such as described above. For example, the view title 602 of the user interface 800 is "Image View With Touch Overlay". A touch view 802 is depicted in the user interface 800. The touch view 802 comprises information indicative of the touches by one or more of the users 116 with respect to one or more of the items 104 or the inventory locations 114.

In the touch view 802 depicted here, the background has been suppressed, as described above, leaving images of the users 116 and their totes 118 visible. Visual indicia indicative of touch boundaries 804 are also presented. The touch boundary 804 is indicative of an area, zone of detection, or region within which presence of an object may generate touchpoint data 334. For example, the touch boundary 804 may be indicative of the placement of a lightplane 504.

Also presented in the touch view 802 is the inventory location outline 710, as well as inventory location detail 806. The inventory location detail 806 provides information such as inventory location identifiers, subdivisions within an inventory location 114, and so forth. For example, as depicted here, the inventory location detail 806 shows the relative position of different shelf racks and the inventory location identifiers associated with those racks.

The user touch association indicator overlay is also active in the touch view 802 depicted in FIG. 8 to present user touch association indicators 808. For example, the user touch association indicator 808 may comprise one or more lines or a polygon extending from a head of the user 116 to the location of the touchpoint 506 within the touch boundary 804. The user touch association indicator 808 may be useful in resolving ambiguities between which user 116 interacted with a particular item 104 or inventory location 114. For example, as depicted here, the user 116(2) and the user 116(5) are both interacting with inventory location 114(13) located on the same rack. In one implementation, the user 116 having a user touch association indicator 808 with the shortest length or distance from the head to the touchpoint 506 may be deemed to be the user 116 interacting with the item 104 at the inventory location 114 corresponding to the touchpoint 506. Continuing the example, the user 116(2) may be determined to be the user 116 interacting with the inventory location 114(13) because the length of the line of the user touch association indicator 808(2) is shorter than that of the user touch association indicator 808(5).

Figure 9:
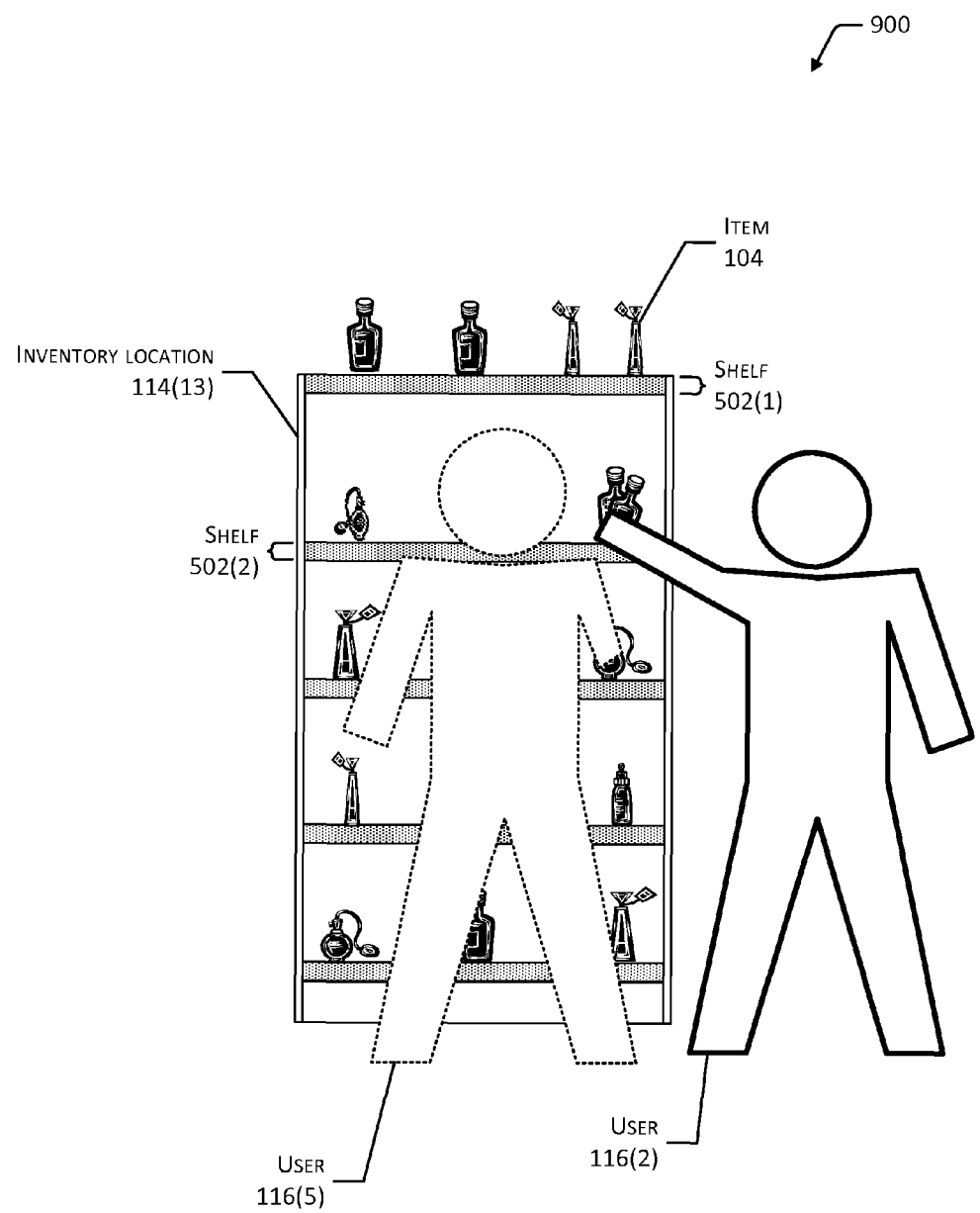
FIG. 9 illustrates an inventory location from which users are interacting with different items, according to some implementations.

FIG. 9 illustrates a front view 900 of an inventory location 114 from which users 116 are interacting with different items 104, according to some implementations. The front view 900 depicted here provides another view of the interaction as shown in the views of FIGS. 6 through 11 between the inventory location 114(13) (and the items 104 stowed or held therein) and the user 116(2) and 116(5).

Figure 10:
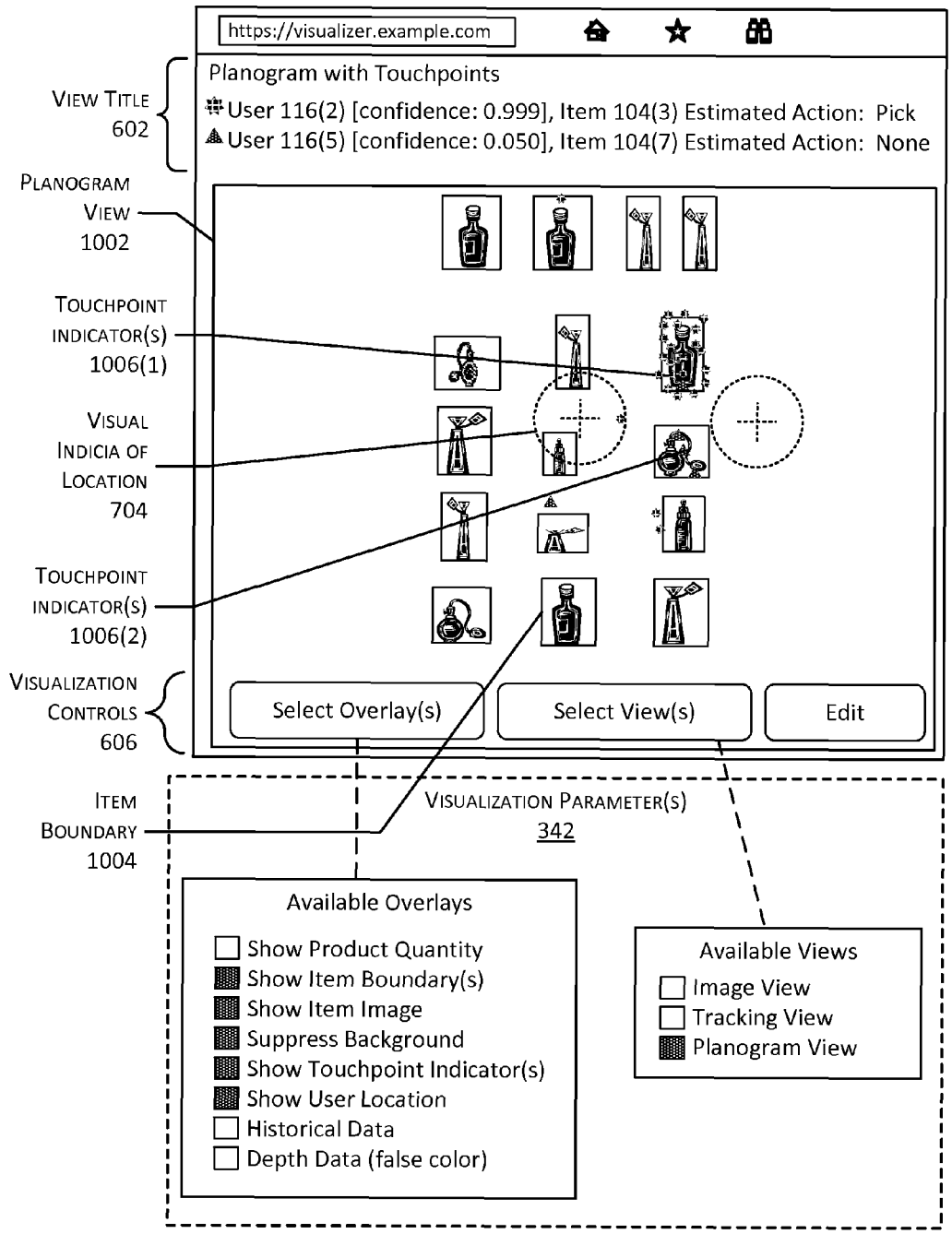
FIG. 10 illustrates a user interface presenting a planogram view with touchpoint overlay providing information about user interaction with items, according to some implementations.

FIG. 10 illustrates a user interface 1000 presenting a planogram view 1002 with touchpoint overlay providing information about user interaction with items 104, according to some implementations.

The user interface 1000 may include a view title 602 and one or more visualization controls 606, such as described above. For example, the view title 602 of the user interface 1000 is "Planogram with Touchpoints". In some implementations, the view title 602 may include supplementary information. For example, the view title 602 of the user interface 1000 includes information such as the user identifiers of the users 116(2) and 116(5) for which touchpoints 506 are depicted, information about the hypothesized item 104 that has been interacted with by the respective user 116, a hypothesis of what the action taken by the respective user 116 was, and the confidence level associated with the hypotheses.

A planogram view 1002 is depicted in the user interface 1000. The planogram view 1002 provides a visual representation of a relative arrangement of one or more items 104 at one or more inventory locations 114, from the point of view or perspective of the user 116 standing in front of the one or more inventory locations 114. One or more of the touchpoints 506 may be accessed and presented as overlays of the planogram.

The planogram view 1002 may depict an overlay showing item boundaries 1004 indicative of a relative shape and size associated with the item 104. For example, the item boundary 1004 may be a silhouette of a single item 104 or may be a rectangle corresponding to the maximum dimensions such as height and width of the item 104. In some implementations, an overlay may present item images of the items 104. For example, within the item boundary 1004, a picture of the actual item 104 stowed or held at that inventory location 114 may be depicted.

Presented in the planogram view 1002 is the touchpoint indicator overlay. The touchpoint indicator overlay presents touchpoint indicators 1006 comprising visual indicia corresponding to a location of the touchpoint 506. The touchpoint 506 is indicative of a point in space that a touch by the user 116 was deemed to be detected or otherwise determined. In some implementations, an attribute of a particular group of touchpoint indicators 1006 may be used to associate the particular touchpoint indicator 1006 with a particular user 116. For example, the touchpoint indicators 1006(1) that are associated with user 116(2) are "star" shaped, while those associated with the user 116(5) are "triangle" shaped.

The analyst 216 may use the planogram view 1002 depicted here with the touchpoint indicator overlay to determine which item 104 was interacted with by a particular user 116. In some implementations, the overall relative positioning or shape of the touchpoint indicators 1006 as compared to the item boundary 1004 may provide information with respect to the type of interaction. For example, where the touchpoint indicators 1006 change over time from one or two touch points at a first time to a cloud of touchpoint indicators 1006 at a second time generally corresponding to the shape of the item boundary 1004, it may be determined that the user 116 reached into the inventory location 114 and picked an item 104. In another example, where the touchpoint indicators 1006 at a first time comprise a cloud of touchpoint indicators 1006 generally corresponding to the item boundary 1004 and a second time where the touchpoint indicators 1006 are much smaller and focused group touchpoint indicators 1006, it may be determined that an item 104 was placed at the inventory location 114.

Also depicted in the planogram view 1002 of the user interface 1000 are the visual indicia of location 704 for the users 116(2) and 116(5). In some situations, the analyst 216 may find this information useful in disambiguating who interacted with an item 104 or inventory location 114 by seeing the relative physical position of the users 116 involved.

Figure 11:
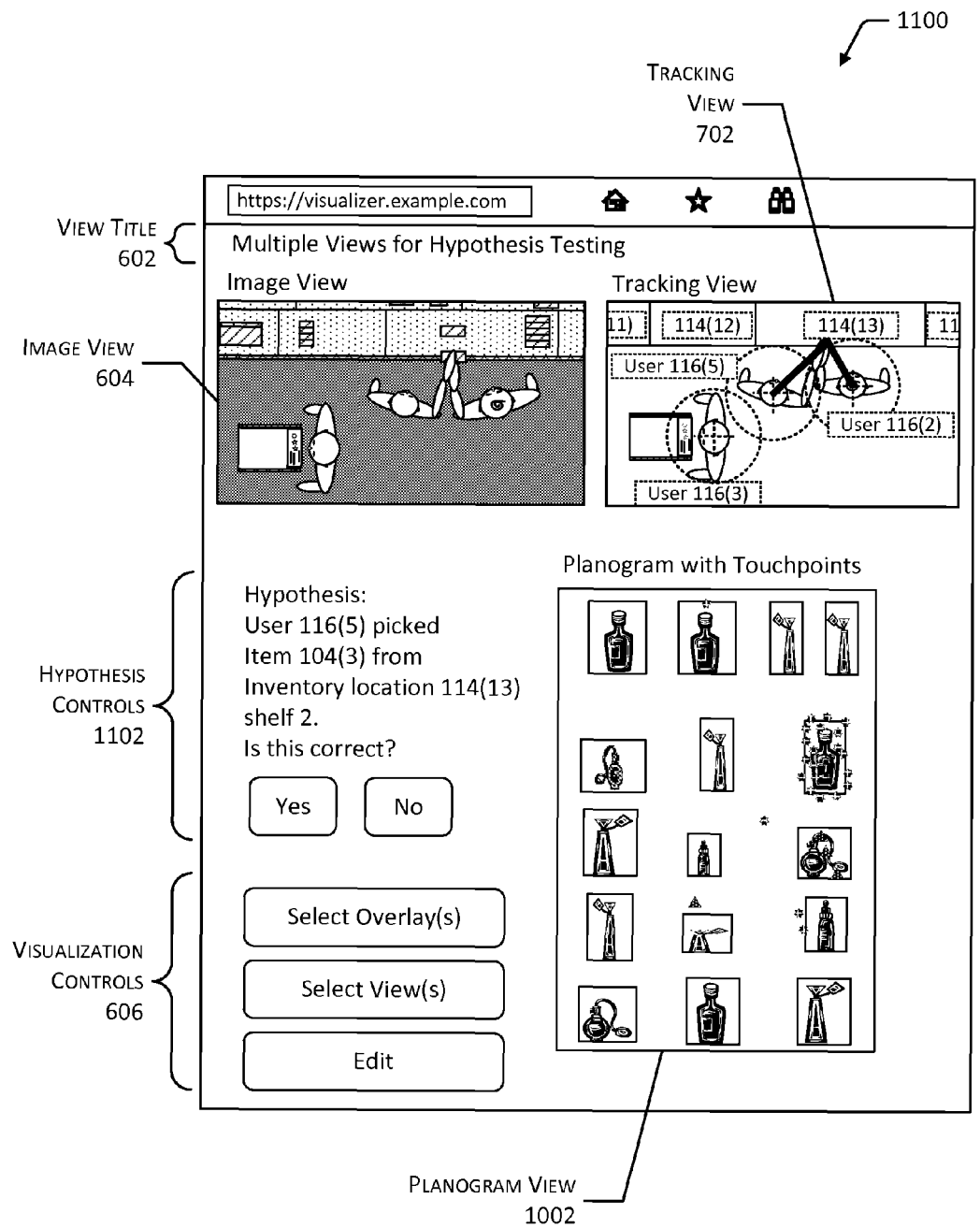
FIG. 11 illustrates a user interface presenting an image view, a tracking view, a planogram view, and controls for testing a hypothesis, according to some implementations.

FIG. 11 illustrates a user interface 1100 presenting multiples views simultaneously as may be used in testing a hypothesis, according to some implementations.

The user interface 1100 may include a view title 602. For example, the view title 602 of the user interface 1100 is "Multiple Views for Hypothesis Testing". The user interface 1100 may also include one or more visualization controls 606, such as described above. Where multiple views are presented in different windows contemporaneously, such as depicted in this figure, the visualization controls may allow for the analyst 216 to move, pan, rotate, or otherwise manipulate the various views simultaneously. For example, the analyst 216 may use a control to pan to the right, moving the portion of the facility 102 presented in the various views to the right. In another example, the analyst 216 may control the views independently of one another to present different portions of the facility 102.

Also presented in the user interface 1100 are an image view 604, a tracking view 702, and a planogram view 1002, such as described above. These views may present information based at least in part on sensor data 126 that may have been collected contemporaneously with one another. For example, the views may present sensor data 126 and processed data 340 associated with a particular interval of time.

As described above, in some implementations, the inventory management module 324 may generate hypotheses based on the sensor data 126. For example, a particular hypothesis may specify that at a given moment in time the user 116(5) performed an action comprising a pick of item 104(3) from the inventory location 114(13), shelf 2. This hypothesis may be assessed by the analyst 216 to determine if the hypothesis is correct, or if incorrect, to provide corrected information in the form of input data 344.

One or more hypothesis controls 1102 may be presented in the user interface 1100. For example, the hypothesis described above is presented along with user input controls to indicate whether the hypothesis is correct or incorrect. The analyst 216 may review the information presented in the user interface 1100 and provide their input as to whether the hypothesis is correct or incorrect. The input data 344 resulting from the activation of the item hypothesis controls 1102 may then be stored in the data store 320 for use by the inventory management module 324 or other modules.

The user interfaces described herein may also include additional controls or functions that are not illustrated. In one implementation, a mouse click or other selection of an element of the user interface may result in additional information being presented about that element. For example, clicking on the user touch association indicator 808 may present additional information such as a graphic depicting the determined path from the user's 116 head along their arm and to the item 104. In another example, clicking on a user identifier 706 may result in presentation of additional details about the user 116, the sensors 120 used to acquire data, the sensor data 126, and so forth.

Illustrative Processes

Figure 12:
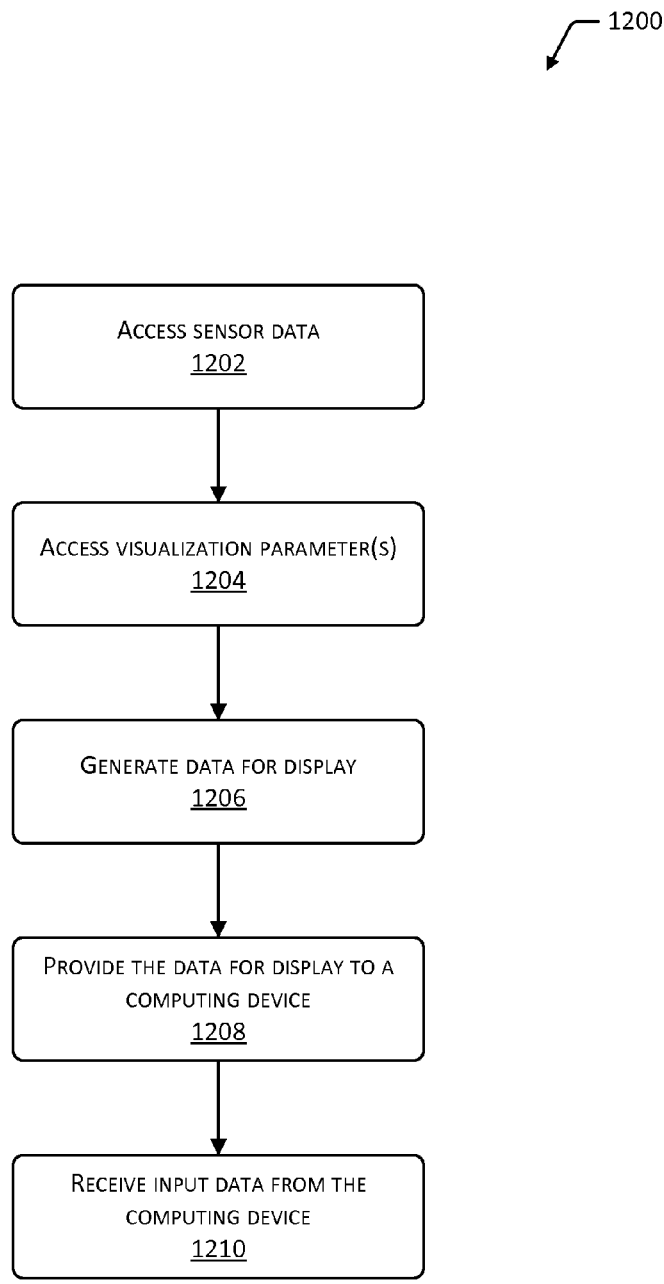
FIG. 12 illustrates a flow diagram of a process of presenting a user interface, according to some implementations.

FIG. 12 illustrates a flow diagram 1200 of a process of presenting a user interface, according to some implementations. In some implementations, the process may be performed at least in part by one or more of the server 204 or the computing device 214.

Block 1202 accesses sensor data 126 collected from one or more of the sensors 120. For example, the data visualization module 330 may access the sensor data 126 stored in the data store 320 by the data acquisition module 326.

Block 1204 accesses one or more of the visualization parameters 342. As described above, the visualization parameters 342 may specify one or more views, overlays, and so forth.

Block 1206 generates the data for display 132. For example, the data for display 132 configured to generate the tracking view 702 may be produced using the physical layout data 124, the sensor data 126, and the processed data 340. The sensor data 126 may be processed by a machine learning system to determine an item 104 associated with an action of the user 116. For example, the user touch association data may be generated using an artificial neural network, set of classifiers, and so forth. The user touch association indicator 808 may be generated for including in the data for display 132.

Block 1208 provides the data for display 132 to the computing device 214. For example, the data for display 132 may be sent to the computing device 214 using the network 202.

Block 1210 receives input data 344 from the computing device 214. For example, the analyst 216 may provide input data 344 using one or more of the item hypothesis controls 1102. For example, this input may be indicative of accuracy of the determination made by the machine learning system. As described above, in some implementations, the input data 344 may be used during subsequent operations of the inventory management module 324. For example, the input data 344 may be used to train the machine learning system to improve the accuracy of future hypotheses.

By using the visualization tools and techniques described in this disclosure, analysts 216 or other humans may feel more readily to configure, maintain, or otherwise administer the inventory management system 122. The large quantity of available sensor data 126 from the different sensors 120 within the facility 102 and the processed data 340 resulting therefrom may be more readily consumed by the analyst 216. As a result, the analyst 216 may be better able to efficiently address operational issues with regard to the facility 102 or perform other tasks.

The processes discussed herein may be implemented in hardware, software, or a combination thereof. In the context of software, the described operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the steps or operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
    sensors within a facility, wherein the sensors include cameras with fields-of-view encompassing one or more of: an inventory location or overhead looking down;
    a memory, storing computer-executable instructions; and
    a hardware processor configured to execute the computer-executable instructions to:
        access sensor data acquired from the sensors;
        generate processed data from the sensor data, wherein the processed data comprises information indicative of:
            a location of a user in the facility,
            a user identifier associated with the user, and
            a user touch association between the user and an item; and
        generate, from the processed data, graphical data for visualizing use of the facility by the user, the graphical data including:
            two or more images from the sensor data that are stitched together to form a single aggregate image,
            visual indicia indicative of the location of the user in the facility overlaying the single aggregate image,
            visual indicia indicative of the user identifier overlaying the single aggregate image, and
            visual indicia indicative of the user touch association overlaying the single aggregate image.

2. The system of claim 1, wherein the sensor data includes images acquired by the cameras; and further wherein the hardware processor is configured to execute the computer-executable instructions to:
    perform facial recognition of one or more of the images with an artificial neural network to identify the user appearing in the sensor data;
    apply a transform to an apparent position of the user identified within the one or more of the images to determine the location of the user in the facility; and
    process the one or more of the images to:
        determine a first contour associated with the user;
        determine a second contour associated with the item;
        determine the first contour and the second contour are in contact with one another; and
        generate the user touch association.

3. The system of claim 1, wherein the sensors comprise a touchpoint sensor; and further wherein the hardware processor is configured to execute the computer-executable instructions to:
    access touchpoint data indicative of a touch to a particular point in space, wherein the touchpoint data is acquired from the touchpoint sensor;
    generate second processed data indicative of touchpoints based on the touchpoint data;
    access a planogram image associated with the inventory location proximate to the touchpoints; and generate second graphical data for visualizing use of the facility by the user comprising visual indicia indicative of the touchpoints overlaying the planogram image.

4. A system comprising:
a memory, storing computer-executable instructions; and
a hardware processor configured to execute the computer-executable instructions to:
  access sensor data acquired from one or more sensors; and
  generate data for display using the sensor data, wherein the data for display comprises:
    a graphical representation of at least a portion of a layout of one or more inventory locations of a material handling facility ("facility");
    visual indicia of a location of a user in the facility at a first time, wherein the visual indicia of the location of the user in the facility at the first time is presented with respect to the graphical representation;
    visual indicia indicative of touchpoint data, wherein the touchpoint data is indicative of a location where user interaction with an item is detected; and
    a graphical representation of at least a portion of the user, acquired by a sensor within an interval of the first time.

5. The system of claim 4, wherein the hardware processor is further configured to execute the computer-executable instructions to:
  access a plurality of images acquired by a camera;
  compare at least a subset of the plurality of images to determine unchanging portions of the plurality of images;
  designate the unchanging portions as background; and
  generate the graphical representation of the at least a portion of the user by subtracting the background from at least one of the plurality of images.

6. The system of claim 4, wherein the hardware processor is further configured to execute the computer-executable instructions to:
  generate the graphical representation of the at least a portion of the user by combining a plurality of images, wherein each of the plurality of images is acquired by a different one of a plurality of cameras.

7. The system of claim 4, wherein the hardware processor is further configured to execute the computer-executable instructions to:
  generate additional data for display comprising:
    a user identifier associated with the user.

8. The system of claim 4, wherein the hardware processor is further configured to execute the computer-executable instructions to:
  generate additional data for display comprising:
    inventory location identifiers associated with the one or more inventory locations.

9. The system of claim 4, wherein the hardware processor is further configured to execute the computer-executable instructions to:
  generate additional data for display comprising:
    a planogram of at least a portion of the one or more inventory locations, wherein the touchpoint data is presented with respect to the planogram.

10. The system of claim 9, wherein the hardware processor is further configured to execute the computer-executable instructions to:
  determine as a touch by the user that a hand of the user was one or more of: proximate to, or in contact with, the item held at the one or more inventory locations.

11. The system of claim 4, wherein the hardware processor is further configured to execute the computer-executable instructions to:
  determine a touchpoint based on the touchpoint data indicative of a portion of the user being one or more of: proximate to, or in contact with, the item held at the one or more inventory locations; and
  generate, for the data for display, an indicator comprising one or more lines extending from an image of a head of the user to the touchpoint.

12. The system of claim 4, wherein the sensor data includes three-dimensional data; and the hardware processor is further configured to execute the computer-executable instructions to:
  determine the location of the user in the facility using a transform indicative of a correspondence between a point in the facility and coordinates in the three-dimensional data.

13. The system of claim 4, wherein the hardware processor is further configured to execute the computer-executable instructions to:
  determine, based on the sensor data, the item associated with an action of the user using a machine learning system; and
  receive input data indicative of accuracy of the determination.

14. A method comprising:
accessing sensor data acquired by one or more sensors in a material handling facility;
accessing touchpoint data indicative of a position of one or more touches of a user with respect to an inventory location;
generating data for display comprising:
  a planogram representative of a plurality of inventory locations; and
  touchpoint indicators presented with respect to the planogram, wherein the touchpoint indicators are indicative of the position of the one or more touches.

15. The method of claim 14, further comprising:
generating additional data for display comprising:
  visual indicia of a location of the user in the material handling facility.

16. The method of claim 14, further comprising:
generating additional data for display comprising:
  a graphical representation of at least a portion of the user, based on an image acquired by a camera within an interval of time of at least a portion of the one or more touches.

17. The method of claim 14, further comprising:
generating additional data for display comprising:
  information indicative of a user identifier associated with the user.

18. The method of claim 14, further comprising:
generating second data for display comprising:
  an aggregate image comprising a plurality of individual images acquired by a plurality of cameras at the material handling facility.

19. The method of claim 18, further comprising:
generating third data for display comprising:
  a tracking view comprising visual indicia of a location of the user in the material handling facility with respect to the aggregate image.

20. The method of claim 14, further comprising:
determining an item associated with an action of the user based on a machine learning system;
generating additional data for display comprising data indicative of the item;
receiving input data indicative of accuracy of the determination; and
training the machine learning system using the input data.

21. A method comprising:
accessing sensor data acquired by one or more sensors in a facility at a first time;
generating data for display using the sensor data, the data for display comprising:
  a planogram representative of one or more inventory locations within the facility;
  visual indicia of a location of a user in the facility at the first time overlaying the planogram; and
  visual indicia indicative of a user identifier overlaying the planogram; and
presenting historical sensor data acquired by the one or more sensors before the first time, wherein the historical sensor data is indicative of one or more touches by the user at the one or more inventory locations, and wherein the historical sensor data is presented as an overlay to the data for display.

* * * * *